US011691756B1

(12) United States Patent
Ludington et al.

(10) Patent No.: US 11,691,756 B1
(45) Date of Patent: Jul. 4, 2023

(54) ENHANCING AIRBORNE VISIBILITY OF GROUND MARKERS BY VERTICAL VARIATION

(71) Applicant: Amazon Technologies, Inc., Seattle, WA (US)

(72) Inventors: Ben Thompson Ludington, Sammamish, WA (US); Takuma Nakamura, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 427 days.

(21) Appl. No.: 16/880,733

(22) Filed: May 21, 2020

(51) Int. Cl.
| | |
|---|---|
| *B64C 39/02* | (2006.01) |
| *B64D 45/08* | (2006.01) |
| *B64D 1/22* | (2006.01) |
| *B64D 1/02* | (2006.01) |
| *G05D 1/00* | (2006.01) |
| *G05D 1/06* | (2006.01) |
| *G06Q 10/0835* | (2023.01) |
| *G06Q 10/0832* | (2023.01) |
| *G06K 7/14* | (2006.01) |
| *B64U 70/00* | (2023.01) |
| *B64U 101/30* | (2023.01) |
| *B64U 101/60* | (2023.01) |

(52) U.S. Cl.
CPC ............ *B64D 45/08* (2013.01); *B64C 39/024* (2013.01); *B64D 1/02* (2013.01); *B64D 1/22* (2013.01); *G05D 1/0094* (2013.01); *G05D 1/0676* (2013.01); *G06K 7/1408* (2013.01); *G06Q 10/0832* (2013.01); *G06Q 10/08355* (2013.01); *B64U 70/00* (2023.01); *B64U 2101/30* (2023.01); *B64U 2101/60* (2023.01)

(58) Field of Classification Search
CPC .. B64D 45/08; B64D 1/02; B64D 1/22; B64C 39/024; B64C 2201/127; B64C 2201/128; B64C 2201/18; B64C 39/02; G05D 1/0094; G05D 1/0676; G06K 7/1408; G06Q 10/0832; G06Q 10/08355
See application file for complete search history.

(56) References Cited

U.S. PATENT DOCUMENTS

| | | | | |
|---|---|---|---|---|
| 10,176,378 | B1* | 1/2019 | Boyd | G06V 20/17 |
| 10,783,478 | B2* | 9/2020 | Studnicka | G06Q 20/389 |
| 10,893,107 | B1* | 1/2021 | Callari | G06F 8/658 |
| 2017/0261977 | A1* | 9/2017 | High | G06Q 10/00 |
| 2017/0270803 | A1* | 9/2017 | High | B64C 39/02 |
| 2018/0068567 | A1* | 3/2018 | Gong | H04W 4/022 |

(Continued)

*Primary Examiner* — Yonel Beaulieu
(74) *Attorney, Agent, or Firm* — Athorus, PLLC

(57) ABSTRACT

A ground marker for use in identifying a location associated with a mission performed by an aerial vehicle includes a visible surface with aspects that are positioned at different vertical heights or elevations. The vertical variation in the aspects of the visible surface enhances a level of visibility of the ground marker within images captured by cameras provided aboard the aerial vehicle, resulting in more accurate estimations of ranges to such markers (e.g., altitudes) determined from such images. The visible surface includes one-dimensional or two-dimensional bar codes, alphanumeric characters and symbols thereon and is provided on or within rigid or flexible frames that are adapted to be placed on ground surfaces at the location associated with the mission.

20 Claims, 17 Drawing Sheets

(56) References Cited

U.S. PATENT DOCUMENTS

| | | | |
|---|---|---|---|
| 2019/0092464 A1* | 3/2019 | Gómez Gutiérrez | ... B64C 37/00 |
| 2021/0049914 A1* | 2/2021 | Dalan | .................. G08G 5/0039 |
| 2021/0300557 A1* | 9/2021 | Oshima | .................. B64D 27/24 |
| 2022/0101551 A1* | 3/2022 | Eberspach | ................ G06T 5/50 |
| 2022/0348363 A1* | 11/2022 | Colson | .................. B65B 59/001 |

* cited by examiner

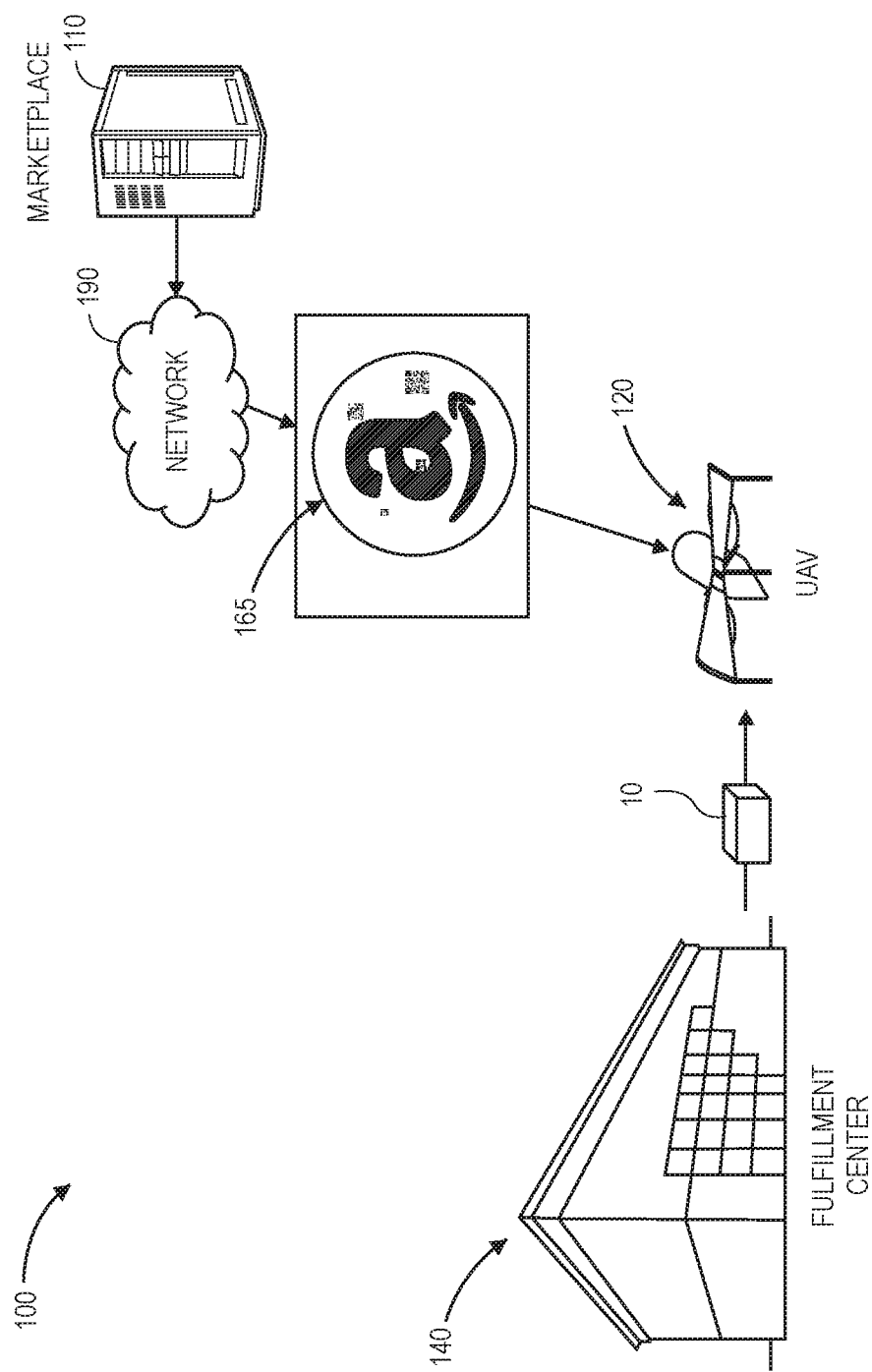

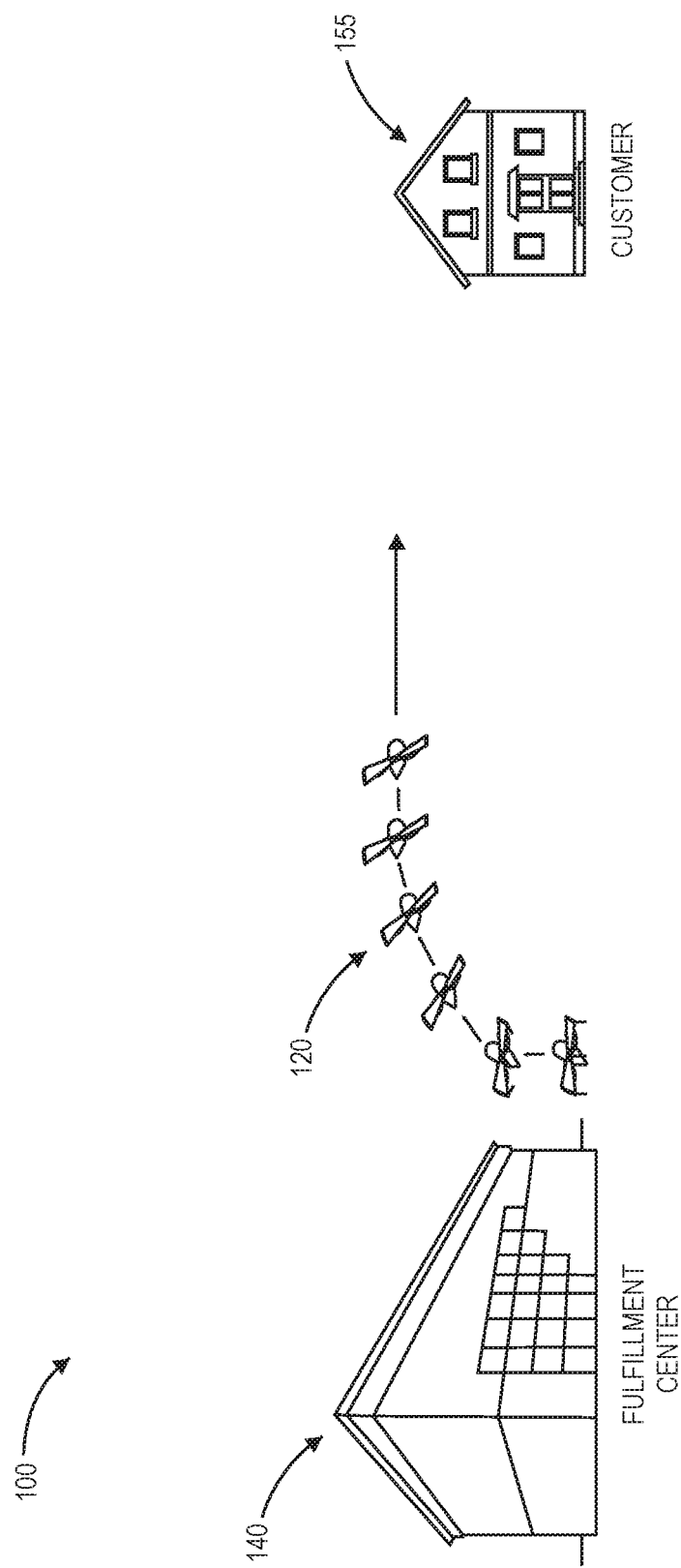

ENHANCING AIRBORNE VISIBILITY OF GROUND MARKERS BY VERTICAL VARIATION

BACKGROUND

Aerial vehicles, including unmanned aerial vehicles, are utilized in an increasing number of personal or commercial applications. For example, an aerial vehicle may be programmed or otherwise configured to transport one or more items ordered by a customer from an origin, such as a warehouse or a retail establishment, to one or more destinations specified by the customer. The ordered items may be manually or automatically loaded into an aerial vehicle, which may be programmed with one or more sets of coordinates corresponding to the destinations, or geolocations, and instructions to travel by air at desired courses, speeds and altitudes to such destinations. Upon arriving at a destination, an aerial vehicle may descend in altitude and release the ordered items at the destination before ascending and departing for another destination or to return to the origin.

In some applications, an aerial vehicle may be programmed or configured to search for and locate a predetermined marker that may be applied to a ground surface at or near a destination, e.g., in one or more images captured by cameras provided aboard the aerial vehicle. The ground marker may be substantially flat, and may include one or more markings thereon, e.g., bar codes, alphanumeric characters, symbols, fiducial markings, or the like, that may be detected within images captured by the cameras, and used to confirm that the ground marker is appropriate for a destination and the performance of one or more missions at the destination. Upon recognizing the ground marker within such images, the aerial vehicle may be programmed to descend toward the ground surface, and to guide itself toward the ground marker, adjusting the operation of one or more propulsion motors and/or control surfaces, as necessary, to maintain the ground marker within a field of view of one or more of the cameras.

As an aerial vehicle descends toward a ground marker, images captured by cameras provided aboard the aerial vehicle may be processed to not only recognize one or more aspects of the ground marker, but also to map aspects of the marker to positions in three-dimensional space, and to determine a location of the aerial vehicle relative to the ground marker, e.g., according to one or more computer vision algorithms. For example, where an aerial vehicle captures images of a ground marker during a descent, the aerial vehicle may process the images to determine a pose of the ground marker (e.g., a position and an orientation of the ground marker) and, therefore, a position and an orientation of the aerial vehicle from the pose of the marker. Occasionally, however, computer vision algorithms encounter biases in estimating positions of aerial vehicles, e.g., distances between such aerial vehicles and ground surfaces, where the ground marker is particularly flat, and is placed upon a particularly flat surface.

BRIEF DESCRIPTION OF THE DRAWINGS

FIGS. 1A through 1H are views of aspects of one system for enhancing airborne visibility of ground markers in accordance with embodiments of the present disclosure.

DETAILED DESCRIPTION

As is set forth in greater detail below, the present disclosure is directed to systems and methods for enhancing the visibility of ground markers by vertical variation of visible surfaces. More specifically, some embodiments of the systems and methods disclosed herein are directed to the use of ground markers having visible surfaces with one or more markings thereon that may be placed on one or more ground surfaces at a location in order to guide aerial vehicles to the location. The visible surfaces may have one or more aspects that are provided at a vertical height or elevation of $\Delta h$ above at least one other aspect of such surfaces. The vertical variation in such surfaces enhances their visibility to cameras provided aboard aerial vehicles, and enables such aerial vehicles to more accurately determine their positions and orientations with respect to such markers. For example, where images captured by the cameras are processed according to one or more computer vision algorithms or techniques, the vertical variation in visible surfaces of ground markers results in more accurate depth estimates to such markers (e.g., altitudes above such markers) calculated from the mapping of the ground markers within the images to points in three-dimensional space.

The vertical variation of visible surfaces on ground markers may be achieved in any manner in accordance with the present disclosure. Moreover, the visible surfaces may have any type or form of markings thereon, including but not limited to bar codes (such as "QR" codes, or "AprilTags"), alphanumeric characters, symbols, fiducial markings, or the like, which may be applied in known positions on one or more visible surfaces of the ground marker.

In some embodiments, vertical variation may be induced by varying an axis of orientation of a camera that is used to capture images of a ground marker during a descent. In some such embodiments, an axis of orientation of a camera may be varied where the camera is mounted to an aerial vehicle by a motor mount, a multi-axis camera gimbal or any other system that may be programmed or configured to temporarily impart small changes upon an axis of orientation of the camera during a descent. Alternatively, in some other embodiments, an axis of orientation of a camera may be varied where the camera is rigidly mounted to an aerial vehicle by operating propulsion motors or control surfaces to temporarily impart yaw, pitch or roll angles on the aerial vehicle during the descent.

Figure 1A:
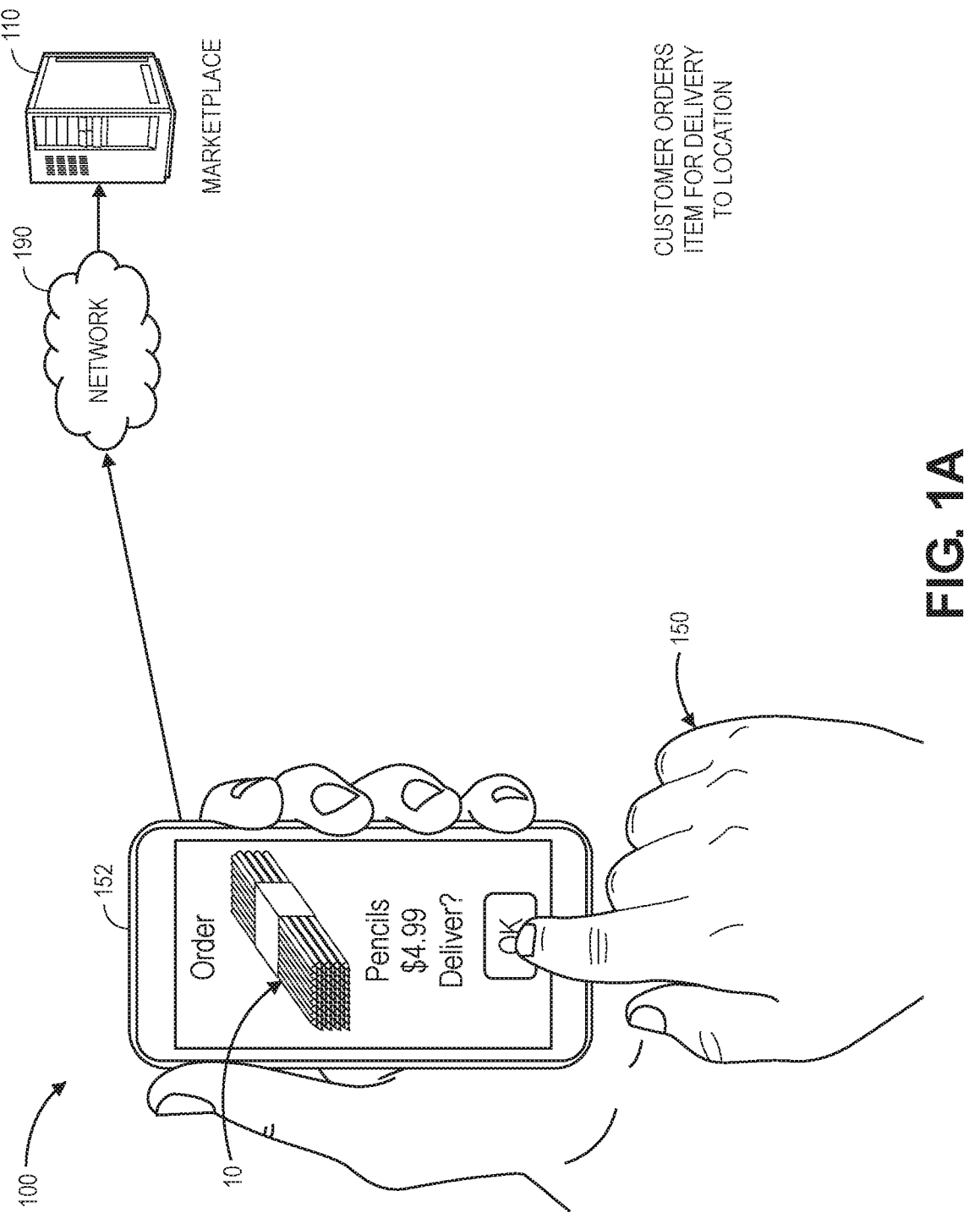
Figure 1B:
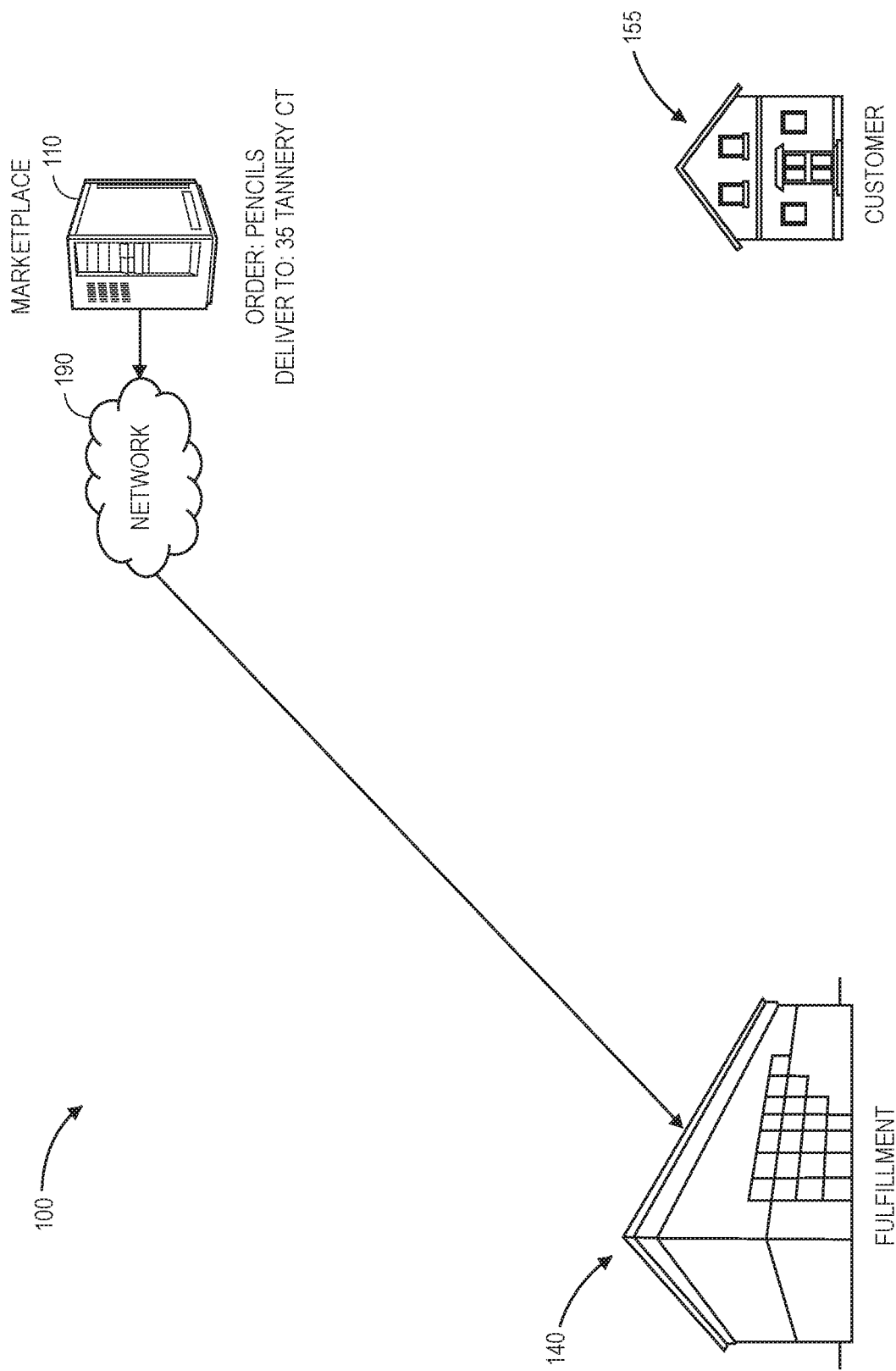

Referring to FIGS. 1A through 1H, views of aspects of one system 100 for enhancing airborne visibility of ground markers in accordance with embodiments of the present disclosure are shown. As is shown in FIG. 1A, a customer 150 completes an order for a delivery of an item 10 via an application operating on a mobile device 152 connected to a server 110 associated with a marketplace over a network 190, which may include the Internet in whole or in part. For example, the customer 150 may execute one or more interactions with the mobile device 152, to select the item 10, make arrangements to pay for the item 10, and specify an address or other geolocator of a location to which the item 10 is to be delivered. The mobile device 152 may be configured for communication via any wired or wireless systems or protocols, including but not limited to Wireless Fidelity (or "Wi-Fi"), radio frequency identification (or "RFID"), near-field communication (or "NFC") readers, Bluetooth®, or any other type of systems or protocols. Alternatively, the customer 150 may place an order for a delivery of the item 10 using any other type or form of computer device, by telephone, in a bricks-and-mortar facility (e.g., a materials handling facility), or in any other manner. As is shown in FIG. 1B, after receiving the order, the server 110 may send one or more instructions to a fulfillment center 140 to deliver the item 10 to a location 155 specified by the customer 150, e.g., over the network 190.

As is shown in FIG. 1C, the item 10 is loaded onto an aerial vehicle 120 by one or more personnel or machines at the fulfillment center 140. The aerial vehicle 120 may be programmed with information or data regarding one or more aspects of the customer 150 or the location 155, e.g., an image of a visible surface 165 of a ground marker, by the server 110 or any other computer devices or machines over the network 190. As is shown in FIG. 1D, after the aerial vehicle 120 has been programmed with the image of the visible surface 165, the aerial vehicle 120 takes off from the fulfillment center 140 with the ordered item 10 and travels to the home 155. Alternatively, the aerial vehicle 120 may be programmed with a geolocator or other identifier of the location 155 prior to departure, and may be programmed with the image of the visible surface 165 or another identifier of the ground marker 160 while en route to the location 155.

Figure 1E:
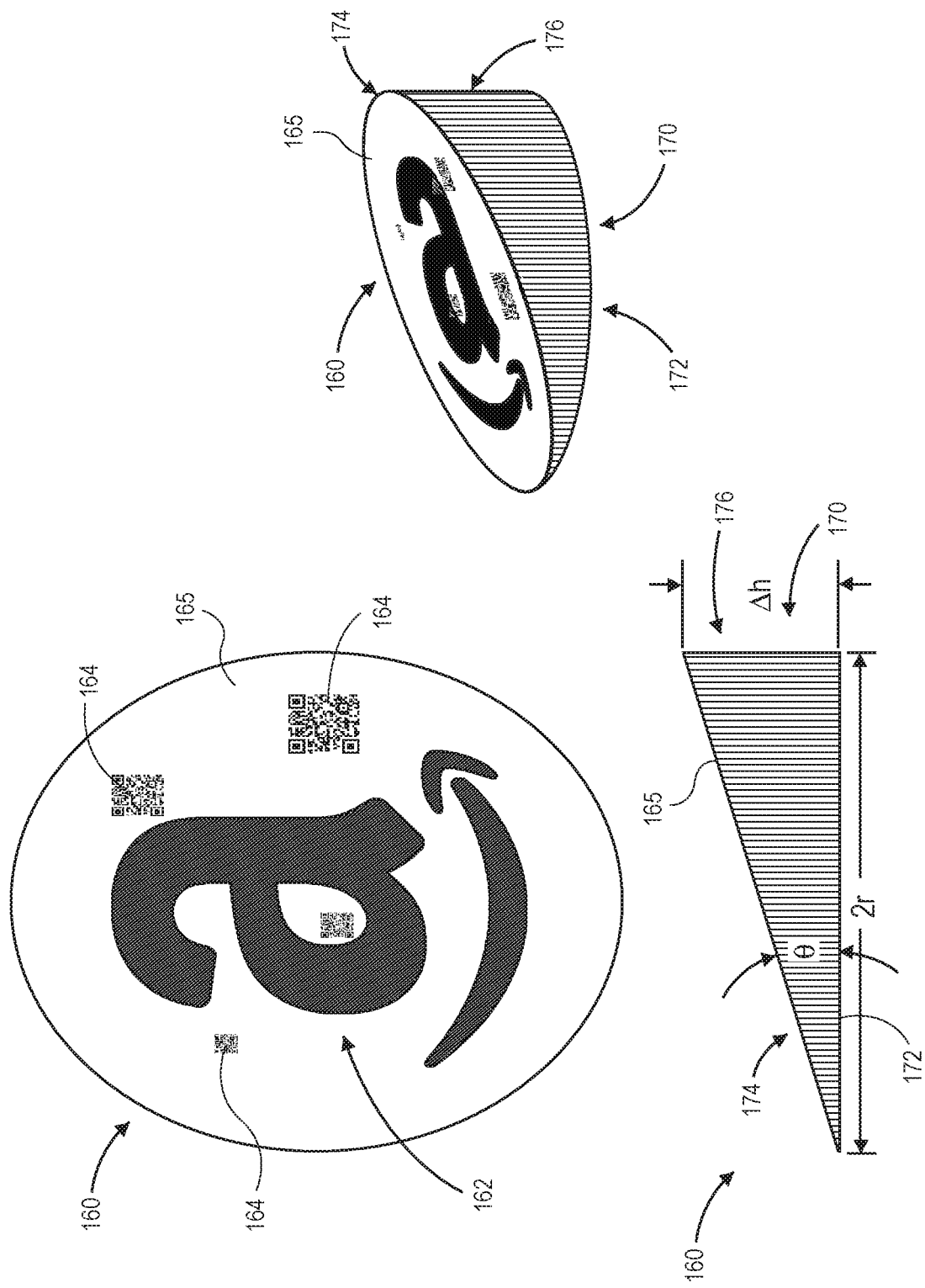

As is shown in FIG. 1E, a ground marker 160 having the visible surface 165 thereon is shown. The ground marker 160 shown in FIG. 1E includes a frame 170 in the form of a solid or substantially hollow cylindrical section (e.g., a cylindrical wedge) having a base 172, an upper platform 174 and a shell 176. The frame 170 may be formed from any number of suitable materials, including but not limited to woods, plastics, metals, composites or others.

In some embodiments, the ground marker 160 may be configured to be laid down upon dirt, grass, gravel, mud, mulch, sand, woodchips or other surfaces or substances, e.g., in a yard or other area within a vicinity of the location 155. Alternatively, the ground marker 160 may be placed upon improved surfaces such as cement, concrete, pavement or wood (e.g., synthetic or natural wood), or any other surfaces, such as decks, driveways, porches, sidewalks, stairs or others.

The upper platform 174 having the visible surface 165 thereon is aligned at a non-parallel angle θ with respect to the base 172 of the ground marker 160 and has a shape of an ellipse. The visible surface 165 includes a plurality of markings that are provided in known, visible locations thereon, including one or more symbols (or trademarks) 162 and a plurality of bar codes 164 (e.g., one-dimensional or two-dimensional bar codes, such as QR codes, or AprilTags). Alternatively, the visible surface 165 may include any number of other symbols or bar codes, as well as any other fiducial markings, or other characters or symbols. Additionally, in some embodiments, the visible surface 165 having the symbols 162, the bar codes 164, or any other markings may be provided on a single, integral layer, which may be applied or affixed to the upper platform 174. In other embodiments, the symbols 162, the bar codes 164 or other markings may be individually applied or affixed to the upper platform 174 in any manner, either individually or collectively, such as by one or more inks, paints, dyes, pigments, decals, stickers, or the like.

As is also shown in FIG. 1E, one edge of the visible surface 165 and/or the upper platform 174 is maintained at a vertical height or elevation of Δh above another edge of the visible surface 165 and/or the upper platform 174, which comes into contact with the base 172 of the ground marker 160. In some embodiments, the angle θ may be approximately ten to fifteen degrees (10-15°), and the diameter 2r of the base of the ground marker 160 may be significantly greater than the height or elevation of Δh. Alternatively, the angle θ may have any other value between zero and ninety degrees (0-90°), and preferably less than thirty degrees (30°).

Figure 1F:
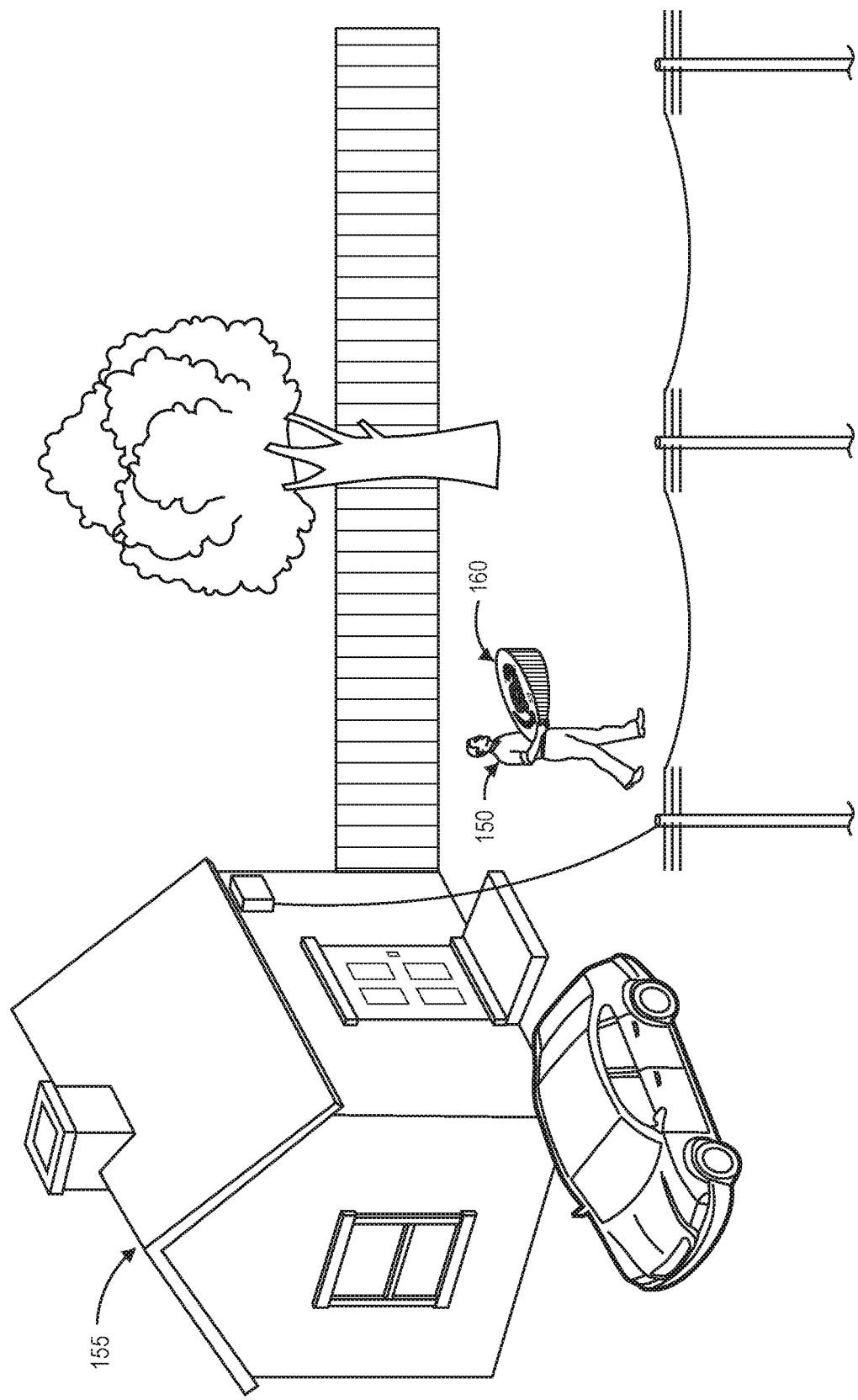
Figure 1G:
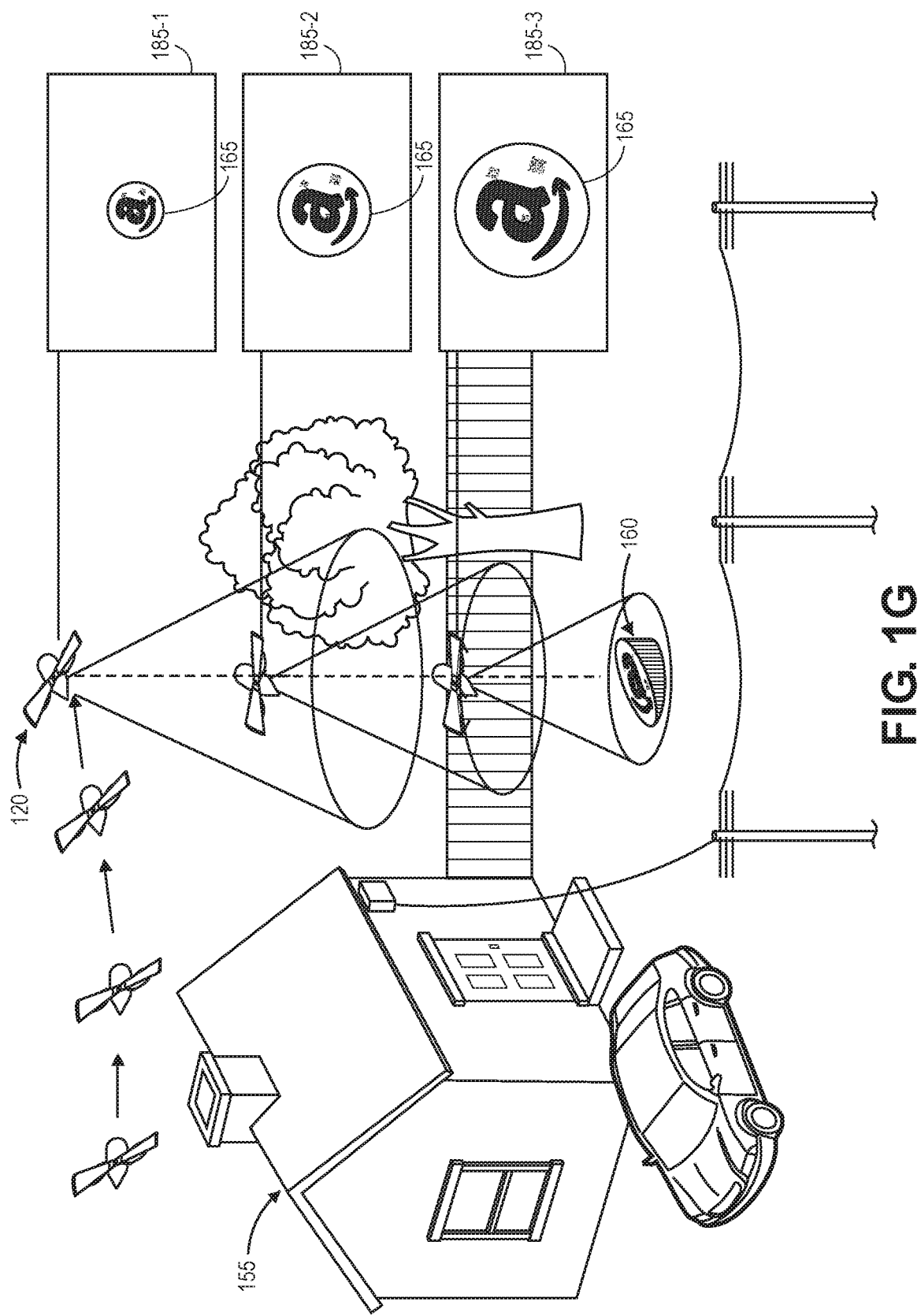

As is shown in FIG. 1F, the customer 150 places the base 172 of the ground marker 160 on a ground surface within a vicinity of the location 155, which may be a home or other dwelling, or any other structure. As is shown in FIG. 1G, upon arriving within a vicinity of the location 155, the aerial vehicle 120 detects the visible surface 165 of the ground marker 160, e.g., in one or more images captured by the aerial vehicle 120.

Upon identifying the visible surface 165 of the ground marker 160, the aerial vehicle 120 aligns itself over the ground marker 160 and monitors its path for obstructions while capturing images 185-1, 185-2, 185-3 and continuing to descend toward the ground marker 160. The images 185-1, 185-2, 185-3 are processed by one or more cameras or other processor-drive components (e.g., computers) to calculate a pose of the aerial vehicle 120 with respect to the features of the ground marker 160, e.g., according to one or more computer vision algorithms, and to determine a range (e.g., an altitude or distance) to the ground marker 160 accordingly.

Figure 1H:
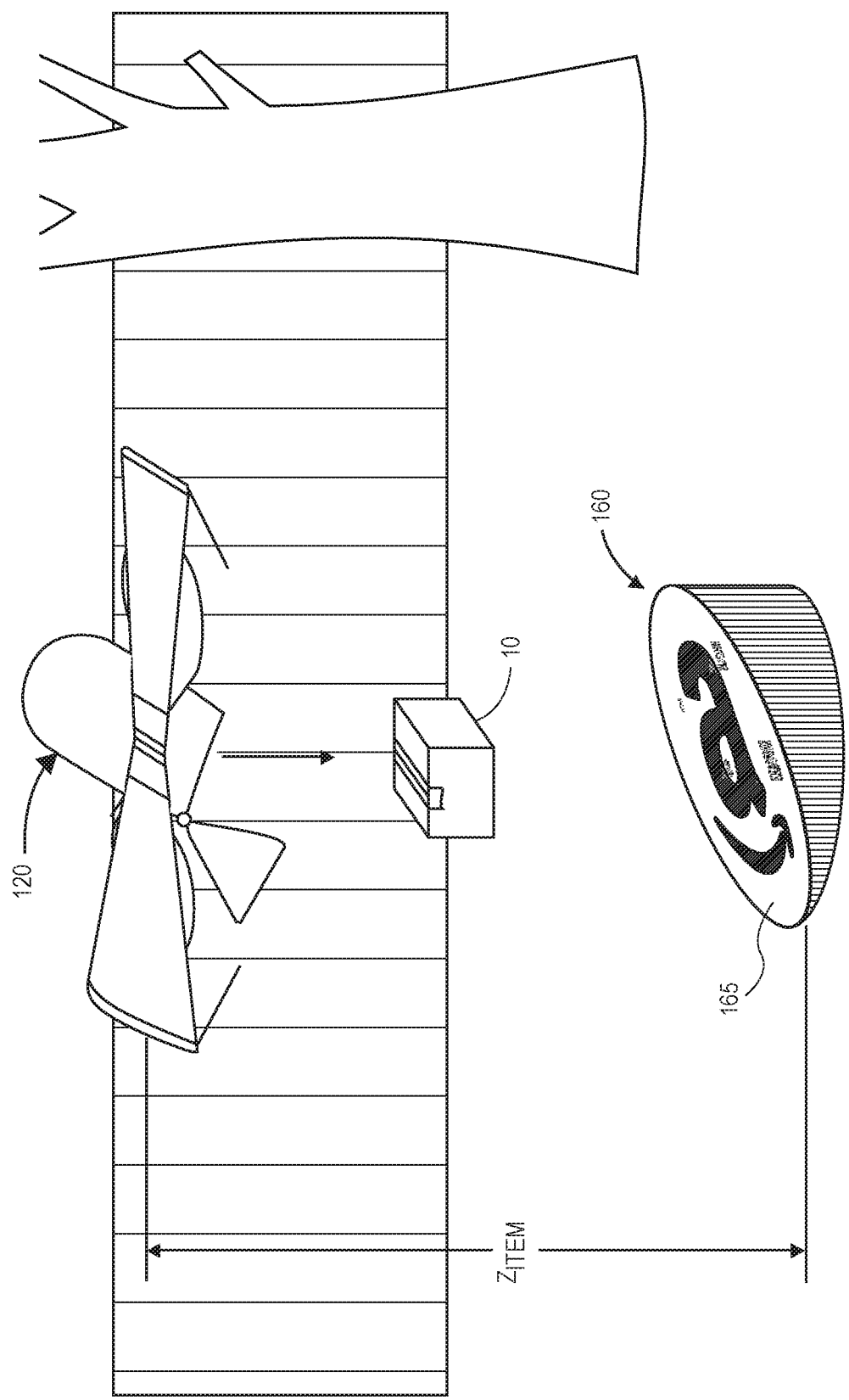

As is shown in FIG. 1H, upon determining that the aerial vehicle 120 is at a delivery altitude for the item 10, or $z_{ITEM}$, the aerial vehicle 120 slows or halts its descent, and releases the item 10 over the ground marker 160. The aerial vehicle 120 then begins an ascent to a traveling altitude before returning to the fulfillment center 140 or traveling to another location.

Accordingly, the systems and methods of the present disclosure are directed to enhancing the visibility of ground markers by vertical variation of visible surfaces. A ground marker having any dimensions, attributes or features may include visible surfaces with one or more markings, including but not limited to bar codes, alphanumeric characters, symbols, fiducial markings, or the like. The ground marker may be constructed or designed such that the visible surfaces have varying heights or elevations with respect to one another, or to a ground surface upon which the ground marker is to be placed. An aerial vehicle may be programmed to search for and detect one or more of the visible surfaces within imaging data captured thereby, and to initiate a descent to a selected altitude, e.g., a landing or hovering operation upon detecting the visible surfaces. Where the aerial vehicle maintains the visible surfaces within a field of view of one or more cameras, images captured of the visible surfaces may be processed to determine a pose of the aerial vehicle in three-dimensional space with respect to features of the ground marker based on the camera calibration parameters, such as the focal length, the optical center, any distortion parameters, or the like. The vertical variation in the visible surfaces of the ground markers results in more accurate depth estimates (e.g., altitudes above such markers).

In some embodiments, a ground marker may be constructed in a manner that causes the visible surfaces to have aspects provided at different heights or elevations with respect to a ground surface or to one another. For example, in some embodiments, a ground marker may be constructed with a frame having one or more visible surfaces or markings thereon that are provided at any non-parallel angle with respect to a base, or otherwise include surfaces or markings that are at different heights from one another, or have varying vertical distances between one another. The ground marker may be placed on a ground surface, e.g., by resting the ground marker on a base, and an aerial vehicle may be configured to search for and detect the one or more visible surfaces or markings thereon during an approach or descent phase. In some other embodiments, a ground marker may include an internal, inflatable bladder with visible surfaces or markings on either or both sides, and a vertical variation in the visible surfaces or markings may be achieved by inflating the bladder. In still other embodiments, a ground marker may take the form of a bin, a basket, or another object with an internal cavity, and with visible surfaces or markings on different aspects of the bin, thereby resulting in a vertical variation between the visible surfaces.

Alternatively, in some embodiments, vertical variation in visible surfaces or markings of ground markers may be induced by varying an axis of orientation of a camera that is used to capture images of a ground marker during a descent. For example, an axis of orientation of a camera may be varied where the camera is mounted to an aerial vehicle by a motor mount, a multi-axis camera gimbal or any other system that may be programmed or configured to temporarily impart small changes upon an axis of orientation of the camera during a descent. Alternatively, in some other embodiments, an axis of orientation of a camera may be varied where the camera is rigidly mounted to an aerial vehicle by operating propulsion motors or control surfaces to temporarily impart yaw, pitch or roll angles on the aerial vehicle during the descent.

Aerial vehicles of the present disclosure may include any number of sensors such as position sensors (e.g., global navigation satellite system receivers or cellular receivers configured to triangulate positions based on signals received from multiple transmitters), inertial measurement sensors (e.g., accelerometers, gyroscopes, magnetometers or compasses), imaging sensors (e.g., digital cameras or other imaging devices) or any other sensors. The aerial vehicles of the present disclosure may also include communications equipment (e.g., wired or wireless means for communication such as components or systems operating Wi-Fi, Bluetooth, NFC or cellular technologies or protocols), along with one or more power modules (e.g., batteries), which may be rechargeable, refuelable or replaceable in nature. Information or data obtained or determined by such sensors or such communications equipment may be utilized in manually or automatically controlling an aerial vehicle, e.g., in causing the aerial vehicle to travel along at one or more courses, speeds or altitudes, to select one or more delivery areas, or to perform one or more missions at such areas. The aerial vehicles of the present disclosure may further include any number of computer components (e.g., processors, data stores, transceivers or input/output devices) for performing any of the tasks or executing any of the functions described herein.

Images of ground markers may be processed according to any computer vision algorithms or techniques in accordance with embodiments of the present disclosure, which may be used to determine a pose of an aerial vehicle from one or more images. In some embodiments, real-world positions of points expressed within images of scenes may be determined according to any number of algorithms, techniques or functions. For example, the Open Source Computer Vision (or "OpenCV") library includes a number of computer-based algorithms or other programming functions that are directed to determining distances or ranges between image sensors and objects based on images. Similarly, a number of other algorithms or techniques programmed in the MATLAB language are publicly available. Computer-based algorithms or techniques are available from a number of other sources, as well. A pose of an aerial vehicle may be determined according to one or more solutions for perspective-n-point problems, or in any other manner, in accordance with embodiments of the present disclosure.

Figure 2:
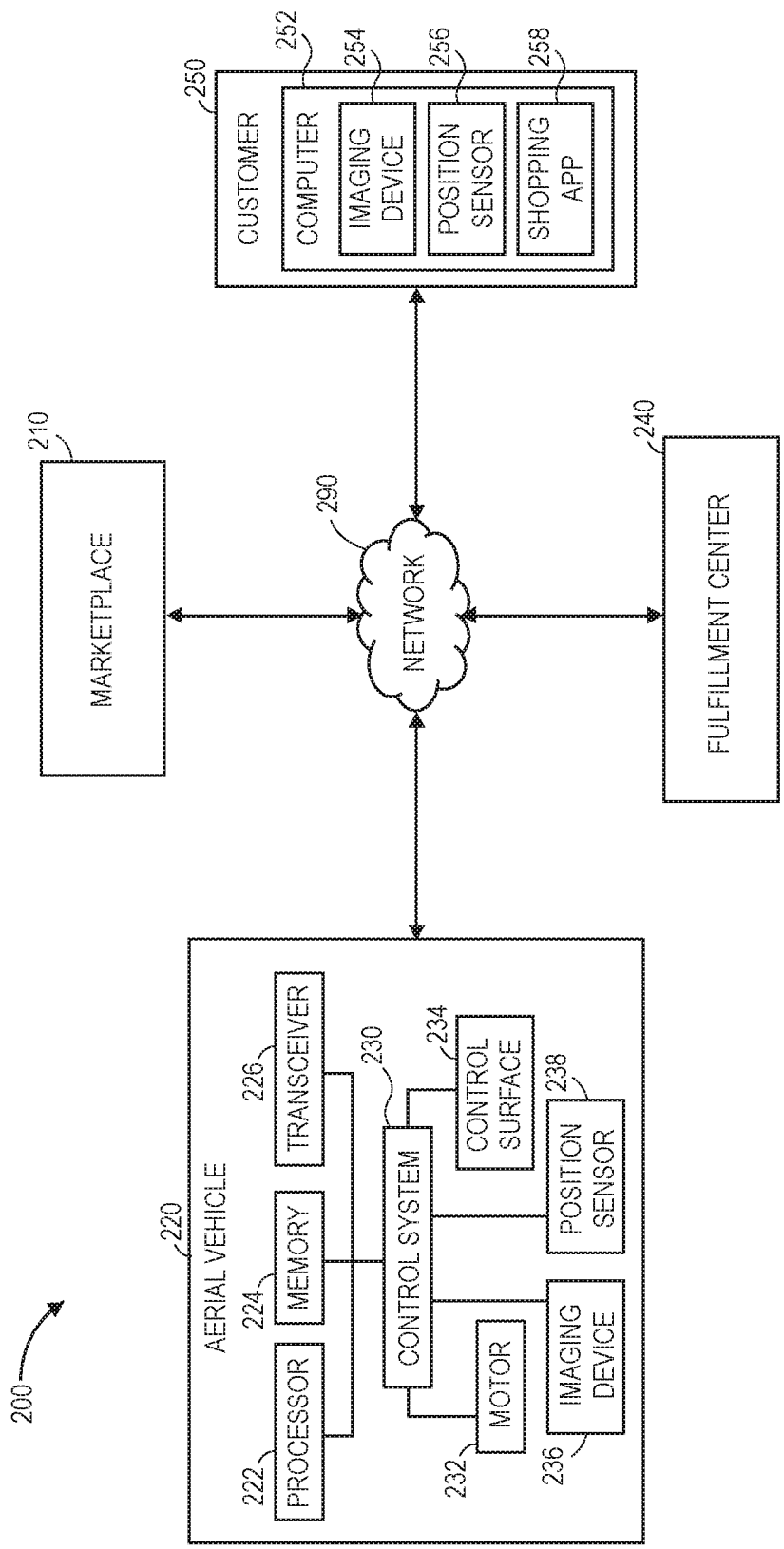
FIG. 2 is a block diagram of components of one system for enhancing visibility of ground markers in accordance with embodiments of the present disclosure.

Referring to FIG. 2, a block diagram of components of one system 200 for enhancing visibility of ground markers in accordance with embodiments of the present disclosure is shown. The system 200 includes a marketplace 210, an aerial vehicle 220, a fulfillment center 240 and a customer 250 that are connected to one another across a network 290, which may include the Internet in whole or in part. Except where otherwise noted, reference numerals preceded by the number "2" shown in FIG. 2 indicate components or features that are similar to components or features having reference numerals preceded by the number "1" shown in FIGS. 1A through 1H.

The marketplace 210 may be any entity or individual that wishes to make items from a variety of sources available for download, purchase, rent, lease or borrowing by customers using a networked computer infrastructure, including one or more physical computer servers, data stores (e.g., databases) or other systems for hosting a network site (e.g., a web site). The marketplace 210 may be physically or virtually associated with one or more storage or distribution facilities, including but not limited to the fulfillment center 240. One or more network sites associated with the marketplace 210 may be implemented by the one or more servers, which connect or otherwise communicate with the one or more data stores as well as the network 290, through the sending and receiving of digital data. Such servers may cause the display of information associated with such network sites in any manner, e.g., by transmitting code such as Hypertext Markup Language (HTML) code over the network 290 to another computing device that may be configured to generate and render the information into one or more pages and to display such pages on a computer display of any kind. Moreover, such data stores may include any type of information regarding items that have been made available for sale through the marketplace 210, or ordered by customers from the marketplace 210.

The aerial vehicle 220 may be any form of vehicle that is configured to travel by air from one location to another location in order to execute one or more tasks or functions, such as a delivery of an item. The aerial vehicle 220 includes a processor 222, a memory 224 and a transceiver 226. The aerial vehicle 220 further includes a control system 230, one or more propulsion motors 232, one or more control surfaces 234, one or more imaging devices 236 and one or more position sensors 238.

The processor 222 may be configured to perform any type or form of computing function associated with the operation of the aerial vehicle 220, including but not limited to the execution of one or more machine learning tools, algorithms or techniques. The processor 222 may also be configured to execute any other algorithms or techniques associated with one or more applications, purposes or functions, or to select at least one of a course, a speed or an altitude for the safe operation of the aerial vehicle 220. For example, the processor 222 may be configured to control any aspects of the operation of the aerial vehicle 220 and the one or more computer-based components thereon, including but not limited to the propulsion motors 232, the control surfaces 234, the imaging devices 236 and the position sensors 238.

The processor 222 may also control the operation of one or more control systems or modules, such as the control system 230, for generating instructions for conducting operations of one or more of the propulsion motors 232, one or more of the control surfaces 234, one or more of the imaging devices 236 and one or more of the position sensors 238, or any other components, e.g., to interpret data captured by one or more onboard sensors (not shown). Such control systems or modules may be associated with one or more other computing devices or machines, and may communicate with the marketplace 210, the fulfillment center 240, the customer 250, or any other computer devices or aerial vehicles (not shown) over the network 290, through the sending and receiving of digital data.

The processor 222 may be a uniprocessor system including one processor, or a multiprocessor system including several processors (e.g., two, four, eight, or another suitable number), and may be capable of executing instructions. For example, in some embodiments, the processor 222 may be a general-purpose or embedded processor unit such as a CPU or a GPU having any number of instruction set architectures (ISAs), such as the x86, PowerPC, SPARC, or MIPS ISAs, or any other suitable ISA. Where the processor 222 is a multiprocessor system, each of the processors within the multiprocessor system may operate the same ISA, or different ISAs.

Additionally, the aerial vehicle 220 further includes one or more memory or storage components 224 (such as databases or data stores) for storing any type of information or data, e.g., instructions for operating the aerial vehicle 220, or information or data captured during operations of the aerial vehicle 220. The memory 224 may be configured to store executable instructions, imaging data, flight paths, flight control parameters and/or other data items accessible by or to the processor 222. The memory 224 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, flight control parameters and/or other data items may be received or sent via the transceiver 226, e.g., by transmission media or signals, such as electrical, electromagnetic, or digital signals, which may be conveyed via a communication medium such as a wired and/or a wireless link.

The transceiver 226 may be configured to enable the aerial vehicle 220 to communicate through one or more wired or wireless means, e.g., wired technologies such as Universal Serial Bus (or "USB") or fiber optic cable, or standard wireless protocols such as Bluetooth® or any Wi-Fi protocol, such as over the network 290 or directly. The transceiver 226 may further include or be in communication with one or more input/output (or "I/O") interfaces, network interfaces and/or input/output devices, and may be configured to allow information or data to be exchanged between one or more of the components of the aerial vehicle 220, or to one or more other computer devices or systems (e.g., other aerial vehicles, not shown) via the network 290. For example, in some embodiments, the transceiver 226 may be configured to coordinate I/O traffic between the processor 222 and one or more onboard or external computer devices or components, e.g., the propulsion motors 232, the control surfaces 234, the imaging devices 236 or the position sensors 238, or any other devices or components (not shown). The transceiver 226 may perform any necessary protocol, timing or other data transformations in order to convert data signals from a first format suitable for use by one component into a second format suitable for use by another component. In some embodiments, the transceiver 226 may include support for devices attached through various types of peripheral buses, e.g., variants of the Peripheral Component Interconnect (PCI) bus standard or the USB standard. In some other embodiments, functions of the transceiver 226 may be split into two or more separate components, or integrated with the processor 222.

The control system 230 may include one or more electronic speed controls, power supplies, navigation systems and/or payload engagement controllers for controlling aspects of the operation of the aerial vehicle 220, as desired. For example, the control system 230 may be configured to cause or control the operation of one or more of the propulsion motors 232, the control surfaces 234, the imaging devices 236, the position sensors 238, or other components, such as to cause one or more of the propulsion motors 232 to rotate propellers at desired speeds, or to cause such propellers to be aligned in selected positions or orientations. The control system 230 may further control any other aspects of the aerial vehicle 220, including but not limited to the operation of one or more aspects of the control surfaces 234 or other features within desired ranges or by desired distances or deflections, or the operation of one or more other components (not shown). The control system 230 may also cause the imaging devices 236 to capture one or more images of any type or form. The control system 230 may further cause the position sensors 238 to determine a position of the aerial vehicle 220. In some embodiments, the control system 230 may be integrated with one or more of the processor 222, the memory 224 and/or the transceiver 226.

The propulsion motors 232 may be any type or form of motor (e.g., electric, gasoline-powered or any other type of motor) capable of generating sufficient rotational speeds of one or more propellers or other components to provide lift and/or thrust forces to the aerial vehicle 220 and any payload engaged thereby, to aerially transport the engaged payload thereby. In some embodiments, one or more of the propulsion motors 232 may be a brushless direct current (or "DC") multi-phase motor such as an outrunner brushless motor or an inrunner brushless motor.

The aerial vehicle 220 may include any number of propulsion motors 232 of any kind. For example, one or more of the propulsion motors 232 may be aligned or configured to provide forces of lift to the aerial vehicle 220, exclusively, while one or more of the propulsion motors 232 may be aligned or configured to provide forces of thrust to the aerial vehicle 220, exclusively. Alternatively, one or more of the propulsion motors 232 may be aligned or configured to provide forces of lift and forces of thrust to the aerial vehicle 220, as needed. For example, the propulsion motors 232 may be fixed in their orientation on the aerial vehicle 220, or configured to vary their respective orientations, e.g., a tilt-rotor aircraft. Moreover, the propulsion motors 232 may be aligned or configured to operate with different capacities or ratings, or at different speeds, or coupled to propellers having different sizes and shapes. For example, in some embodiments, one or more of the propulsion motors 232 may be an electric motor, and one or more of the propulsion motors 232 may be a gasoline-powered motor.

Each of the propulsion motors 232 may be coupled to one or more propellers (or rotors or rotatable systems) having a plurality of shaped blades joined to a hub or boss. For example, each of such propellers may be rotatably mounted to a mast or shaft associated with a respective one of the propulsion motors 232 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The control surfaces 234 may be any sections or appurtenances provided on surfaces of the aerial vehicle 220 that may be manipulated in order to dynamically modify a position or orientation of the aerial vehicle 220 with respect to one or more degrees of freedom. For example, the control surfaces 234 may include, but are not limited to, ailerons, brakes, elevators, elevons, flaps, rudders, slats, tailerons or wings, or other features. In some embodiments, each of the control surfaces 234 may include a motor, such as an electrical, mechanical and/or hydraulic or other component or actuator for rotating, translating or otherwise repositioning or reorienting a respective one of the control surfaces 234 during operation of the aerial vehicle 220, under the control of the one or more processors 222 or the control system 230. In some embodiments, each of the control surfaces 234 may include a directional sensor, such as any type of sensor or other component that is embedded into one or more aspects of one of the control surfaces 234 (e.g., a leading edge, a trailing edge, a tip or one or more other faces or aspects of such surfaces 234) and configured to gather information or data with respect to an alignment or orientation thereof.

The imaging devices 236 may be any form of optical recording devices that may be aligned with respect to any expected or ordinary operating orientation of the aerial vehicle 220, and are configured to photograph or otherwise record imaging data of objects or any other elements within fields of view forward of, aft of, lateral to, above or below the aerial vehicle 220, or for any other purpose. The imaging devices 236 may include one or more processors, one or more memory or storage components, and one or more image sensors, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). The imaging devices 236 may capture imaging data in the form of one or more still or moving images of any kind or form, as well as any relevant audio signals or other information during the operation of the aerial vehicle 220.

The imaging devices 236 may be mounted, fixed, embedded or otherwise joined to one or more external surfaces of the aerial vehicle 220 in any manner and in any orientation or alignment to capture imaging data from above, below or alongside the aerial vehicle 220. For example, the imaging devices 236 may be coupled to any form of support system or structure for maintaining the lenses or other optical elements of the imaging devices 236 at a selected orientation or configuration. Alternatively, the imaging devices 236 may be mounted, fixed, embedded or otherwise joined to external surfaces of the aerial vehicle 220 in any other manner.

The imaging devices 236 may communicate with the processor 222 and/or the control system 230, or with one another, by way of a wired or wireless connection that may be dedicated or comprise all or part of an internal network (not shown), e.g., an internal communications bus. Additionally, the imaging devices 236 may be adapted or otherwise configured to communicate with the marketplace 210, the fulfillment center 240, the customer 250 or any other external entity or system by way of the network 290. The imaging devices 236 may be of any type or form in accordance with the present disclosure, including but not limited to one or more digital cameras, depth sensors or range cameras, infrared cameras, radiographic cameras or other optical sensors.

The imaging devices 236 may also include manual or automatic features for modifying their respective fields of view or orientations. For example, one or more of the imaging devices 236 may be configured in a fixed position, or with a fixed focal length (e.g., fixed-focus lenses) or angular orientation. Alternatively, one or more of the imaging devices 236 may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 236, or changes in one or more of the angles defining the angular orientation.

For example, one or more of the imaging devices 236 may be hard-mounted to a support or mounting that maintains the device in a fixed configuration or angle with respect to one, two or three axes. Alternatively, however, one or more of the imaging devices 236 may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

The position sensors 238 may be any device, component, system or instrument adapted to receive signals (e.g., trilateration data or information) relating to a position of the aerial vehicle 220. For example, the position sensors 238 may be adapted to receive signals from one or more satellites of a positioning network, such as Global Positioning System (or "GPS") satellites, GLONASS satellites, Galileo satellites, or satellites of any other global navigation satellite system. The position sensors 238 may also be adapted to receive signals from one or more towers or beacons from a cellular telephone network, or from any other source (not shown). In some embodiments, the position sensors 238, or position data received thereby, may be used to determine a speed of the aerial vehicle 220 over time. In some other embodiments, the aerial vehicle 220 may further include any number of other devices, components, systems, or instruments for determining a speed or velocity of the aerial vehicle 220, and may include related components (not shown) such as pitot tubes, accelerometers, or other features.

Alternatively, or additionally, the aerial vehicle 220 may include any number of other components or systems, e.g., partially or entirely within the aerial vehicle 220 or external to the aerial vehicle 220. Such components may include, but are not limited to, one or more pitot tubes, antennas, transmitters, receivers, ventilation ducts (e.g., intakes or exhausts), actuators, brackets, fuselages, joints, junctions, landing gear, struts or other components or features that may be mounted to component parts of a frame, or to one or more component parts mounted to the frame. Such components may also include, but are not limited to, one or more compasses, speedometers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones).

The propulsion motors 232, the control surfaces 234, the imaging devices 236, the position sensors 238, or any other components may be coupled to a frame or other structure or surface of the aerial vehicle 220, or to any other object, by one or more joints or junctions (or other connectors or connections). Such joints or junctions may be defined or formed in any manner and by any components or techniques including but not limited to nuts and/or bolts, clips, rivets, fasteners, adhesives or welds. Additionally, although the block diagram of FIG. 2 includes a single box for a propulsion motor 232, a single box for a control surface 234, a single box for an imaging device 236 and a single box for a position sensor 238, those of ordinary skill in the pertinent arts will recognize that any number or type of propulsion motors, control surfaces, imaging devices or position sensors may be provided aboard the aerial vehicle 220 in accordance with the present disclosure, and that such propulsion motors 232, such control surfaces 234, such imaging devices 236 or such position sensors 238, or any other components, may be joined or coupled to a frame or to one another by any number of joints or junctions.

The fulfillment center 240 may be any facility that is adapted to receive, store, process and/or distribute items on behalf of the marketplace 210, or on behalf of one or more manufacturers, merchants, sellers or vendors of such items. The fulfillment center 240 may also include a networked computer infrastructure for performing various computer-related functions associated with the receipt, storage, processing and distribution of such items, including one or more physical computer servers, data stores (e.g., databases) and processors, that may be provided in the same physical location as the fulfillment center 240, or in one or more alternate or virtual locations, e.g., in a "cloud"-based environment. The fulfillment center 240 may also include stations for receiving, storing and distributing items to customers, such as one or more receiving stations, storage areas and distribution stations. The fulfillment center 240 may also include any number of workers or other designated personnel tasked with performing one or more tasks within the fulfillment center 240, e.g., by handling or transporting items within the fulfillment center 240, or operating one or more pieces of equipment therein, such as cameras or other image recording devices. Furthermore, the fulfillment center 240 may also include one or more workers or staff members who may handle or transport items within the fulfillment center 240. Such workers may operate one or more computing devices or machines for registering the receipt, retrieval, transportation or storage of items within the fulfillment center 240, or a general-purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The fulfillment center 240 may operate one or more order processing and/or communication systems using one or more other computing devices or machines that may be connected to the network 290, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 240 may include one or more receiving stations featuring any apparatuses that may be required in order to receive shipments of items at the fulfillment center 240 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 240 may also include one or more predefined two-dimensional or three-dimensional storage areas including facilities for accommodating items and/or containers of such items, such as aisles, rows, bays, shelves, slots, bins, racks, tiers, bars, hooks, cubbies or other like storage means, or any other appropriate regions or stations. The fulfillment center 240 may further include one or more distribution stations where items that have been retrieved from a designated storage area may be evaluated, prepared and packed for delivery from the fulfillment center 240 to addresses, locations or destinations specified by customers, also by way of carriers such as cars, trucks, trailers, freight cars, container ships or cargo aircraft (e.g., manned aircraft or unmanned aircraft, such as drones).

The customer 250 may be any entity or individual that wishes to download, purchase, rent, lease, borrow or otherwise obtain items (e.g., goods, products, services or information of any type or form) from the marketplace 210. The customer 250 may utilize one or more computing devices 252 (e.g., smartphones, tablet computers, laptop computers, desktop computers, as well as computer devices provided in automobiles, wristwatches, home appliances, televisions or any other machine). The computing devices 252 may include one or more imaging devices 254 and/or position sensors 256. Additionally, the computing devices 252 may also operate or access one or more software applications, such as a browser (not shown) or a shopping application 258, and may be connected to or otherwise communicate with the marketplace 210, the aerial vehicle 220, the fulfillment center 240 or any other computer devices or systems through the network 290, by the transmission and receipt of digital data. Moreover, the customer 250 may also receive deliveries or shipments of one or more items from facilities maintained by or on behalf of the marketplace 210, such as the fulfillment center 240, or from one or more manufacturers, merchants, sellers or vendors (not shown), which may but need not be associated with either the marketplace 210 or the fulfillment center 240. The imaging devices 254 and the position sensors 256 may share one or more properties in common with the imaging devices 236 or the position sensors 238, respectively, described above, or may have one or more properties that are different from the imaging devices 236 or the position sensors 238.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent arts will recognize that users of such computers, servers, devices and the like may operate a keyboard, keypad, mouse, stylus, touchscreen, or other device (not shown) or method (e.g., speech recognition or gesture recognition devices or techniques) to interact with the computers, servers, devices and the like, or to "select" an item, link, node, hub or any other aspect of the present disclosure.

Imaging data (e.g., still or moving images, as well as associated audio data or metadata) captured using either or both of the imaging devices 236, 254 may be processed according to any number of recognition techniques. In some embodiments, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, or does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Those of ordinary skill in the pertinent arts will understand that process steps described herein as being performed by a "marketplace," an "aerial vehicle," a "fulfillment center," a "customer," or like terms, may be automated steps performed by their respective computer systems, or implemented within software modules (or computer programs) executed by one or more general purpose computers. Moreover, process steps described as being performed by a "marketplace," an "aerial vehicle," a "fulfillment center," or a "customer" may be typically performed by a human operator, but could, alternatively, be performed by an automated agent.

The marketplace 210, the aerial vehicle 220, the fulfillment center 240 or the customer 250 may use any web-enabled or Internet applications or features, or any other client-server applications or features including E-mail, or other messaging techniques, to connect to the network 290 or to communicate with one another, such as through short or multimedia messaging service (SMS or MMS) text messages, social network messages, online marketplace messages, telephone calls or the like. For example, the marketplace 210 and/or the fulfillment center 240 may be adapted to transmit information or data in the form of synchronous or asynchronous messages to the aerial vehicle 220 or the customer 250, or any other entity or computer device, in real time or in near-real time, or in one or more offline processes, via the network 290. Those of ordinary skill in the pertinent art would recognize that the marketplace 210, the aerial vehicle 220, the fulfillment center 240, or the customer 250 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components utilized by the aerial vehicle 220, the fulfillment center 240, or the customer 250, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
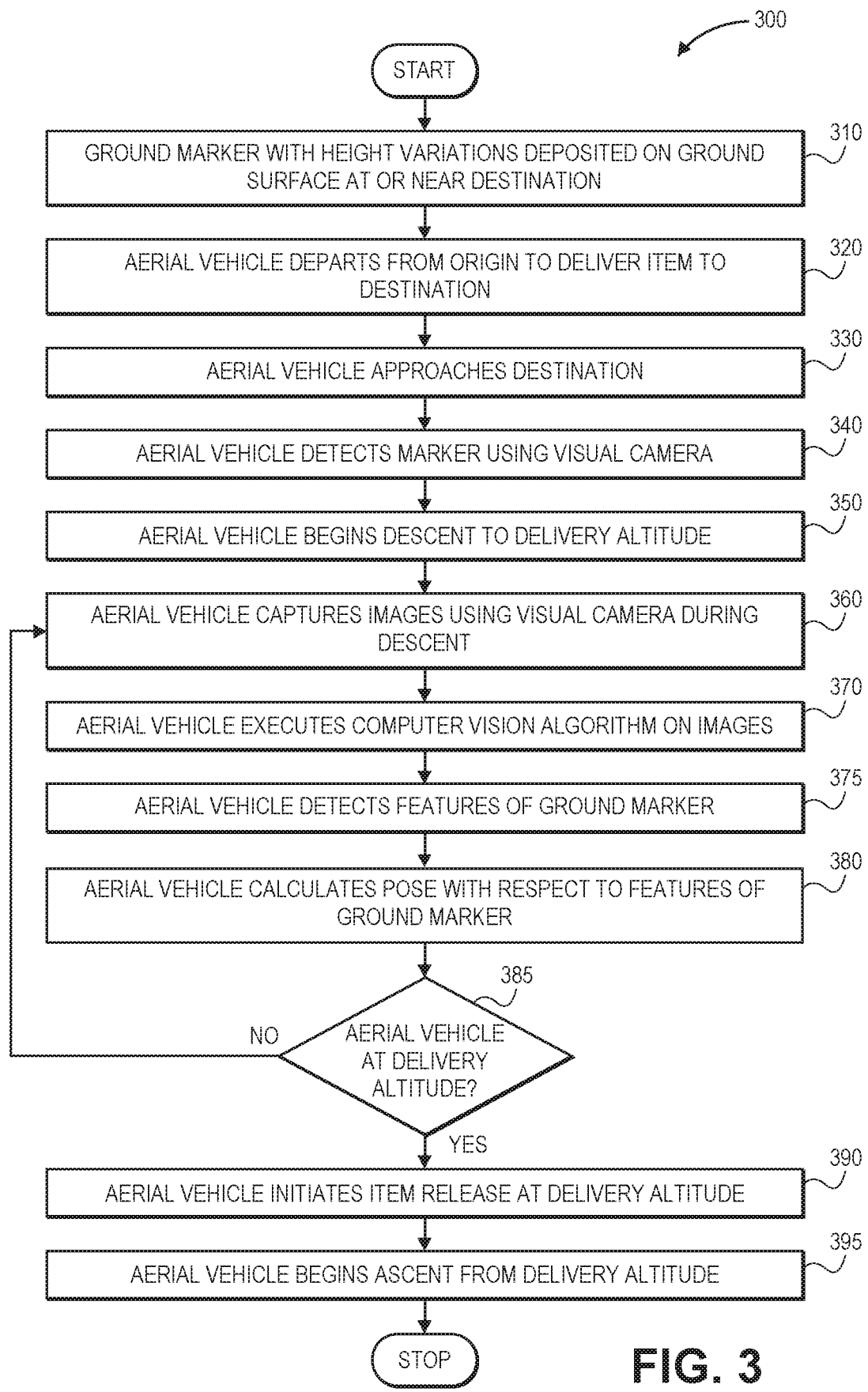
FIG. 3 is a flow chart of one process for enhancing visibility of ground markers in accordance with embodiments of the present disclosure.

Referring to FIG. 3, a flow chart 300 of one process for enhancing visibility of ground markers in accordance with embodiments of the present disclosure is shown. At box 310, a ground marker having a vertical height variation is deposited on a ground surface at or near a destination. For example, in some embodiments, a customer may place the ground marker on a ground surface that is adjacent to or otherwise affiliated with the destination, and may unfold, unroll, or otherwise expand or expose one or more portions of the ground marker, as necessary. The ground surface may be a portion of a yard, a patio, a driveway, a sidewalk, a walkway, a street, a roof, or another surface associated with the destination, e.g., within a vicinity of one or more homes or other structures. In some embodiments, the ground surface may be privately owned lands associated with a home or structure, including but not limited to lands owned in common with the home or structure, or otherwise owned or associated with the homes or structure, e.g., by one or more neighborhood or condominium associations. Alternatively, the ground surface may be publicly owned land, or land that is owned or controlled by one or more private owners not associated with the homes or structures, and for which permission for an aerial vehicle to land, park or otherwise stand has been granted or otherwise obtained. In accordance with the present disclosure, the ground surface need not be associated with a home or other dwelling, and need not be adjacent to or otherwise affiliated with one or more structures. Additionally, in some embodiments, an individual or entity that places the ground marker at the destination may but need not be a customer.

In some embodiments, the ground marker may have any number of discrete visible portions, such as colors, patterns, logos, alphanumeric characters, symbols, images, or other readily visible markings, that are provided in discrete locations on one or more surfaces of the ground marker. For example, the ground marker may have one or more visible portions that are provided at a first height or elevation with respect to the ground surface, and one or more other visible portions that are provided at a second height or elevation with respect to the ground surface. In some embodiments, one or more of the visible portions may rest on the ground surface, while one or more other visible portions may rest at a predetermined height or elevation above the ground surface.

At box 320, an aerial vehicle departs from an origin to deliver an item to the destination. For example, a customer may place an order for a delivery of an item by a computer device or system such as a desktop computer, a laptop computer, a tablet computer, a mobile device, a smart speaker, or any other system that is configured to receive information regarding the order from the customer. The item may be loaded onto an aerial vehicle at a fulfillment center, a materials handling facility or another location, and the aerial vehicle may be programmed with one or more sets of instructions for causing the aerial vehicle to travel from the origin to the destination and to deliver the item at the destination, e.g., by depositing or releasing the item on one or more ground surfaces. Alternatively, in some embodiments, an aerial vehicle may be dispatched to the destination for the performance of any mission, and need not conduct any deliveries to the destination. For example, a customer may request an aerial vehicle to retrieve one or more parcels, documents or other items for delivery to another location.

At box 330, the aerial vehicle approaches the destination. For example, the aerial vehicle may be programmed with one or more sets of instructions for traveling along one or more routes or paths, e.g., one or more courses or speeds and at one or more selected altitudes, based on information or data captured by onboard sensors such as position signals (e.g., global navigation satellite system signals), images (e.g., depth or visual images), inertial measurement unit signals (e.g., positions, velocities, accelerations, along or about one or more axes), or any other information or data. At box 340, the aerial vehicle detects the ground marker using a visual camera. For example, the aerial vehicle may be programmed with information or data regarding the visual appearance of one or more surfaces of the ground marker, and programmed to process images captured by the visual camera to determine whether such images depict the ground marker. The visual camera may have a field of view that extends below the aerial vehicle, at least in part, and may be configured to capture images at any frame rate. The images may be captured from any altitude or perspective with respect to the ground marker, and may include any portion of the ground surface within a field of view. Such images may contain or depict any type or form of imaging data, including but not limited to one or more of a visual image, e.g., a color image, a grayscale image or a black-and-white image, as well as a depth image or any other type of image.

After detecting the ground marker using the visual camera, the process advances to box 350, where the aerial vehicle begins a descent to a delivery altitude. For example, where the aerial vehicle arrives at the destination at an altitude of approximately one hundred meters, the aerial vehicle may begin to descend toward the ground marker, e.g., by slowing or stopping forward or horizontal velocity, and controlling the aerial vehicle to reduce its altitude while traveling in a substantially vertical direction toward the ground marker.

At box 360, the aerial vehicle captures images using a visual camera during the descent. For example, the aerial vehicle may capture images at any frame rate using a visual camera having a field of view extending substantially below the aerial vehicle, at least in part. The visual camera that captures the images may be the same visual camera that detected the marker at box 340, or a different visual camera.

At box 370, the aerial vehicle executes one or more computer vision algorithms on the images, and at box 375, the aerial vehicle detects one or more features of the ground marker within the images. For example, a control system or one or more computer systems aboard the aerial vehicle, including but not limited to processors of the visual camera, may execute one or more object recognition algorithms or techniques to recognize corners, edges or other features of the ground marker, e.g., by any number of contours, outlines, colors, textures, silhouettes, shapes or other characteristics of objects, or portions of objects, expressed within the images, using one or more algorithms or machine-learning tools. Where one or more visual characteristics of the ground marker are known, such algorithms or tools may be configured to search the image for the one or more visual characteristics and determine, to any degree of confidence, whether the image depicts all or a portion of the ground marker, or to identify portions of the image depicting the ground marker.

At box 380, the aerial vehicle calculates a pose with respect to one or more features of the ground marker. For example, upon detecting the one or more features of the ground marker within the images, the control system or other computer systems, e.g., processors of the visual camera, may determine a pose of the aerial vehicle with respect to the marker in three-dimensional space, based on camera calibration parameters such as the focal length, the aspect ratio, the optical center, any distortion parameters, or the like. An estimation of the pose (e.g., the orientation and/or position) of the ground marker in three-dimensional space may be determined based on a homography matrix, and the pose of the aerial vehicle in three-dimensional space (e.g., an altitude) may be determined with respect to the pose of the ground marker.

At box 385, the aerial vehicle determines whether the aerial vehicle is positioned at a delivery altitude, e.g., a proper altitude from which the item may be released or otherwise deposited on the ground surface below the aerial vehicle. For example, a distance between the aerial vehicle may be determined from the pose calculated at box 380 and compared to a predetermined delivery altitude, which may be selected for a given aerial vehicle (or class of vehicles), a given item (or class of items), or for the destination, or on any other basis. In some embodiments, the delivery altitude may be a predetermined height above the ground marker. In some other embodiments, however, the delivery altitude may be in contact with the ground marker, e.g., an altitude of zero above the ground surface.

If the aerial vehicle has not yet reached the delivery altitude, then the process returns to box 360, where the aerial vehicle continues to capture images using the visual camera during the descent. If the aerial vehicle has reached the delivery altitude, however, then the process advances to box 390, where the aerial vehicle initiates a release of the item at the delivery altitude. For example, the aerial vehicle may open a compartment or other space and drop, urge, eject or otherwise release the item therefrom. Alternatively, the item may be releasably tethered within the aerial vehicle, and permitted to be lowered, dangled or suspended above the ground surface before being disconnected from the tether. The item may also be removed or otherwise released from the aerial vehicle by way of a robotic arm or other implement, e.g., by gripping the item within the aerial vehicle using an end effector or other element of the robotic arm and releasing the item outside of the aerial vehicle.

At box 395, after initiating the release of the item at the delivery altitude, the aerial vehicle begins its ascent, and the process ends.

Referring to FIGS. 4A through 4D, views of ground markers in accordance with embodiments of the present disclosure are shown. Except where otherwise noted, reference numerals preceded by the number "4" in FIGS. 4A through 4D refer to elements that are similar to elements having reference numerals preceded by the number "2" in FIG. 2 or by the number "1" shown in FIGS. 1A through 1H.

Figure 4A:
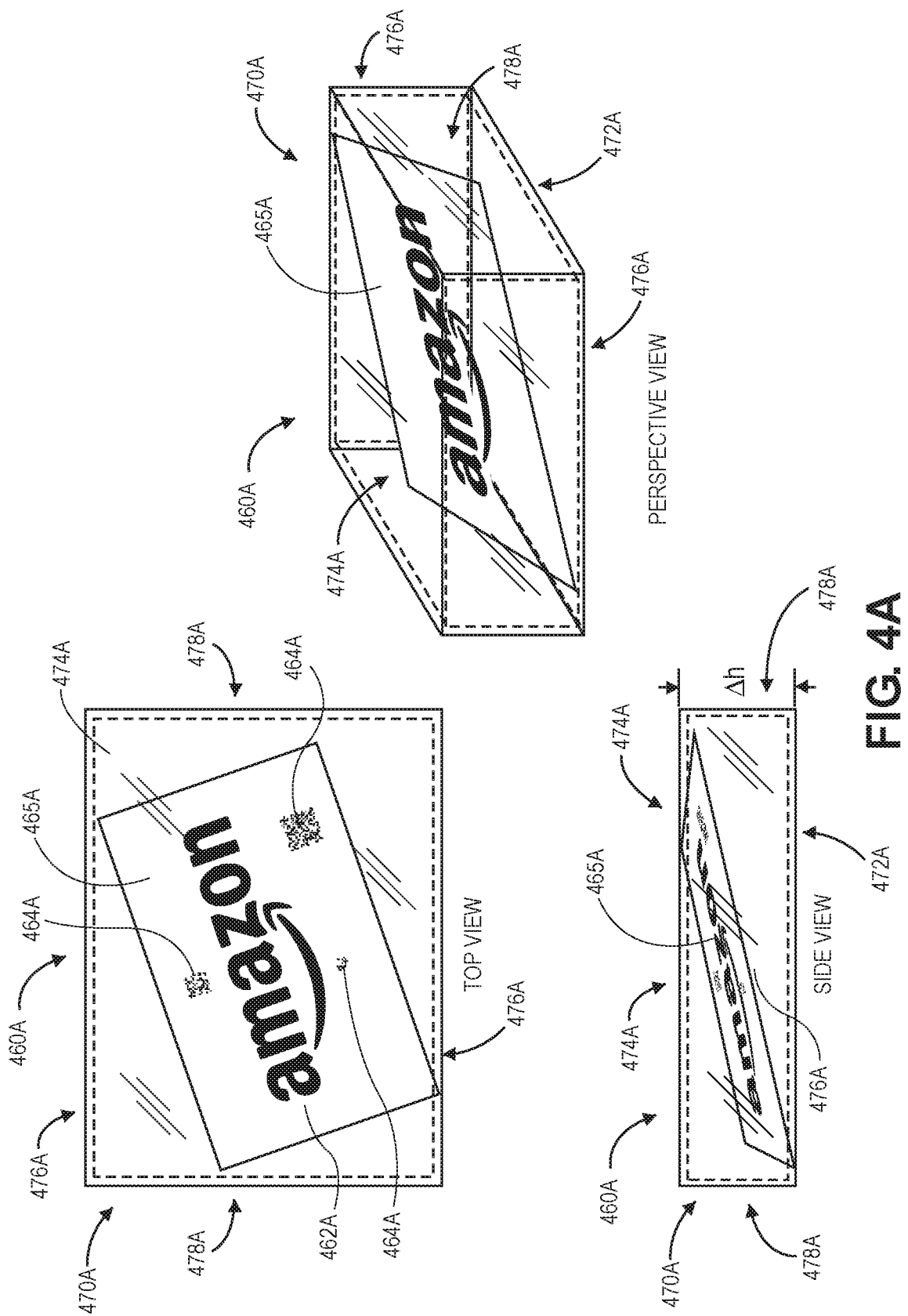
FIGS. 4A through 4D are views of ground markers in accordance with embodiments of the present disclosure.

As is shown in FIG. 4A, a ground marker 460A includes a frame 470A having a visible substrate (or platform) 465A disposed therein. The frame 470A may be formed from one or more sheets, planes or sections of acrylic, plexiglass or other substantially translucent or transparent materials, which may be glued, welded or formed together, including but not limited to a base 472A (or a bottom panel), a top panel 474A, a pair of long side panels 476A and a pair of short side panels 478A. The frame 470A shown in FIG. 4A defines a hollow interior having a substantially rectangular shape, and is defined by the base 472A, the top panel 474A, and the side panels 476A, 478A, that are aligned perpendicular to one another to form a container or system having the substrate 465A disposed therein in a fixed orientation with respect to the frame 470A.

The substrate 465A is a substantially planar object having a plurality of visible markings on one or both sides of the substrate 465A, including but not limited to bar codes, alphanumeric characters, symbols, fiducial markings, or the like, in known positions on one or more surfaces of the substrate 465A.

Alternatively, the frame 470A and/or the substrate 465A of the ground marker 460A may have sides or cross-sections of any other flat or rounded shape (e.g., round, triangular, pentagonal, hexagonal, or others). For example, in some embodiments, the frame 470A may have a shape of a cylinder, and the substrate 465A may be provided at a non-parallel angle with respect to the base 472A or the top panel 474A, e.g., in a shape of an ellipse.

As is further shown in FIG. 4A, the substrate 465A is provided within the frame 470A in such a manner that causes at least one visible aspect of the substrate 465A to be maintained at a vertical height or elevation of $\Delta h$ above at least one other visible aspect of the substrate 465A. For example, in some embodiments, one or more sides or corners of the substrate 465A may be mounted, pinned, suspended, hung, clipped or coupled to one or more internal surfaces within the frame 470A to place the substrate 465A at a non-parallel angle with respect to the base 472A or the top panel 474A, such that at least one visible aspect of the substrate 465A is provided at a different vertical height or elevation of at least one other visible aspect of the substrate 465A.

Figure 4B:
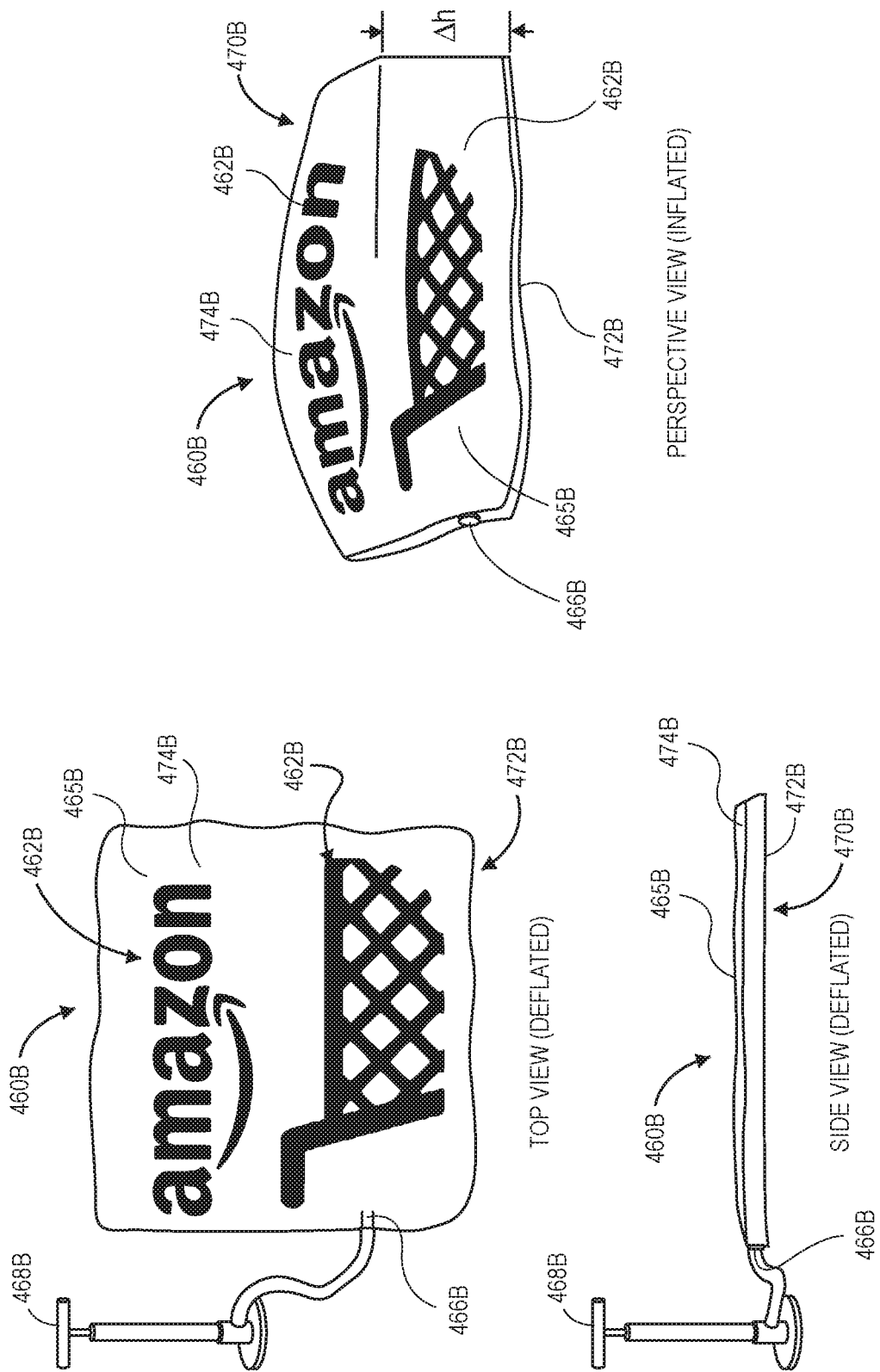

As is shown in FIG. 4B, a ground marker 460B includes a bladder 470B (or bag) defined by a pair of overlying panels 472B, 474B formed from discrete pieces of flexible film (e.g., thermoplastic film) or other substances and joined or otherwise sealed together about their respective peripheries, e.g., by heat sealing, bonding, spot-welding or the like. Alternatively, in some embodiments, the panels 472B, 474B may be formed from a single-piece construction and folded or creased. The panels 472B, 474B may be formed from any suitable materials, including but not limited to thermoplastic films such as polyvinylchloride, polyethylene, polyester or polyurethane, or any other substances.

As is also shown in FIG. 4B, the ground marker 460B includes a plurality of visible markings, e.g., a pair of symbols 462B (or trademarks), on an visible surface 465B of the panel 474B facing away from the panel 472B. Alternatively, or additionally, the visible surface 465B may have any number of other symbols or trademarks, as well as any number of bar codes, alphanumeric characters, symbols, fiducial markings, or the like.

As is further shown in FIG. 4B, the ground marker 460B also includes a check valve (or another type or form of valve) 466B that may be used to fully or partially initiate, control or secure a flow of fluids into the bladder 470B, such as by charging air into a space between the panels 472B, 474B, e.g., by a pump 468B, which may be manually or automatically operated. Thus, as is shown in FIG. 4B, with the ground marker 460B inflated, at least one aspect of the visible surface 465B is maintained at a vertical height or elevation of $\Delta h$ above at least one other aspect of the visible surface 465B.

Figure 4C:
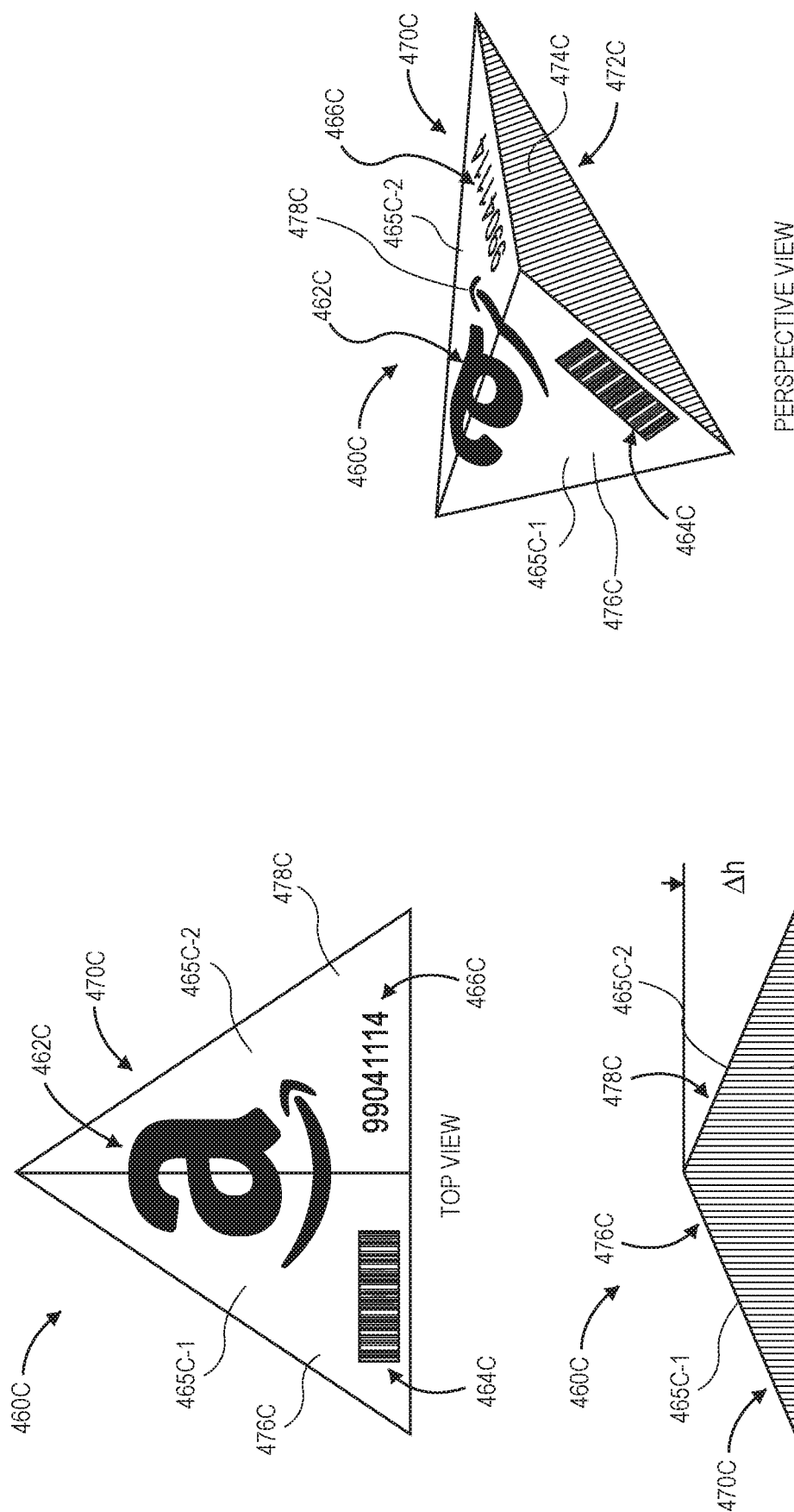

As is shown in FIG. 4C, a ground marker 460C includes a frame 470C in a shape of a tetrahedron having a horizontal base 472C, a vertical panel 474C, and a pair of angled panels 476C, 478C. The frame 470C may be either solid or hollow, and the base 472C and the panels 474C, 476C, 478C may be formed from one or more sheets, planes or sections of any suitable materials, including but not limited to woods, plastics, metals, composites or others, which may be glued, welded or formed together in any manner.

As is shown in FIG. 4C, the ground marker 460C includes a pair of visible surfaces 465C-1, 465C-2 provided on the angled panels 476C, 478C. As is also shown in FIG. 4C, the visible surfaces 465C-1, 465C-2 have a plurality of visible markings thereon, including a symbol (or trademark) 462C, a bar code 464C, a set 466C of alphanumeric characters, or any other symbols, fiducial markings, or the like, which may be provided in known positions on the visible surfaces 465C-1, 465C-2. Such markings may be applied by inks, paints, dyes, pigments, decals, stickers, or the like, on the surfaces 465C-1, 465C-2.

As is further shown in FIG. 4C, edges between the panels 474C, 476C, 478C are raised with respect to the base 472C. The raised edges of the frame 470C cause at least one visible aspect of the visible surfaces 465C-1, 465C-2 to be maintained at a vertical height or elevation of $\Delta h$ above at least one other visible aspect of the visible surfaces 465C-1, 465C-2. In some embodiments, the ground marker 460C may include visible markings on each of the panels 474C, 476C, 478C, and the panel 474C need not be vertically aligned.

Figure 4D:
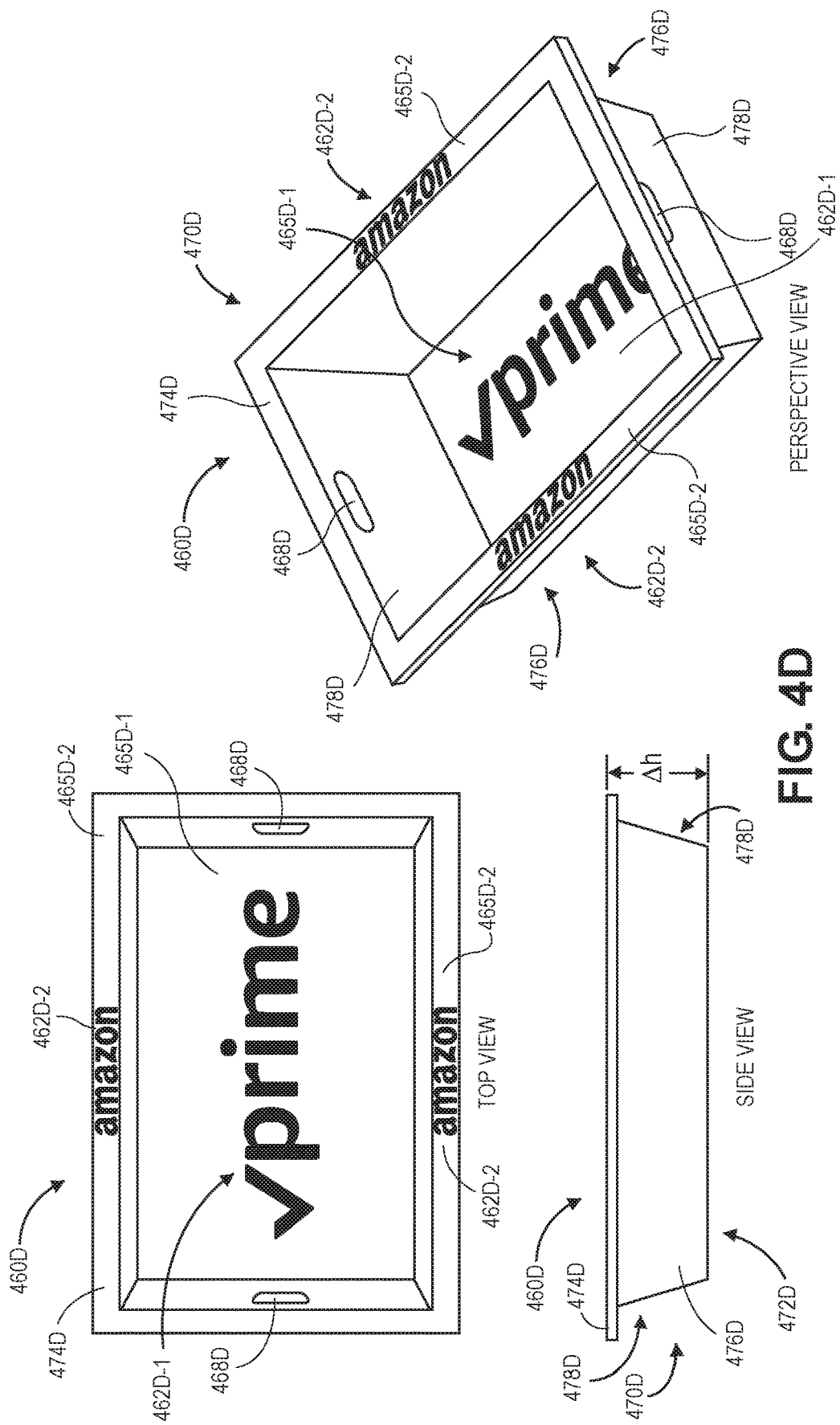

As is shown in FIG. 4D, a ground marker 460D has a frame 470D in a shape or form of a bucket (or a bin). The frame 470D of the ground marker 460D includes a bottom panel 472D, an upper platform 474D, a pair of long side panels 476D and a pair of short side panels 478D. The upper platform 474D extends about a perimeter defined by upper edges of the long side panels 476D and the short side panels 478D, and laterally outward of the perimeter. Additionally, each of the short side panels 478D of the frame 470D includes a handle 468D in the form of an oval or another opening for accommodating one or more fingers of a hand therein. The frame 470D may be formed from any suitable materials, including but not limited to woods, plastics, metals, composites or others.

Additionally, as is also shown in FIG. 4D, the ground marker 460D has a pair of visible surfaces 465D-1, 465D-2. The visible surface 465D-1 is an upper surface of the bottom panel 472D and has a plurality of symbols (or trademarks) 462D-1 or other markings, e.g., bar codes, alphanumeric characters, symbols, fiducial markings, or the like, provided in known positions on the visible surface 465D-1. Such markings may be applied by inks, paints, dyes, pigments, decals, stickers, or the like, on the visible surface 465D-1. Additionally, the visible surface 465D-2 is an upper surface of the upper platform 474D, and also includes a plurality of symbols (or trademarks) 462D-2 or other markings that may be applied in any manner thereon.

As is further shown in FIG. 4D, the visible surface 465D-2 on the upper platform 474D is provided at a vertical height or elevation of $\Delta h$ above the visible surface 465D-1 on the bottom panel 472D of the frame 470D.

Figure 5:
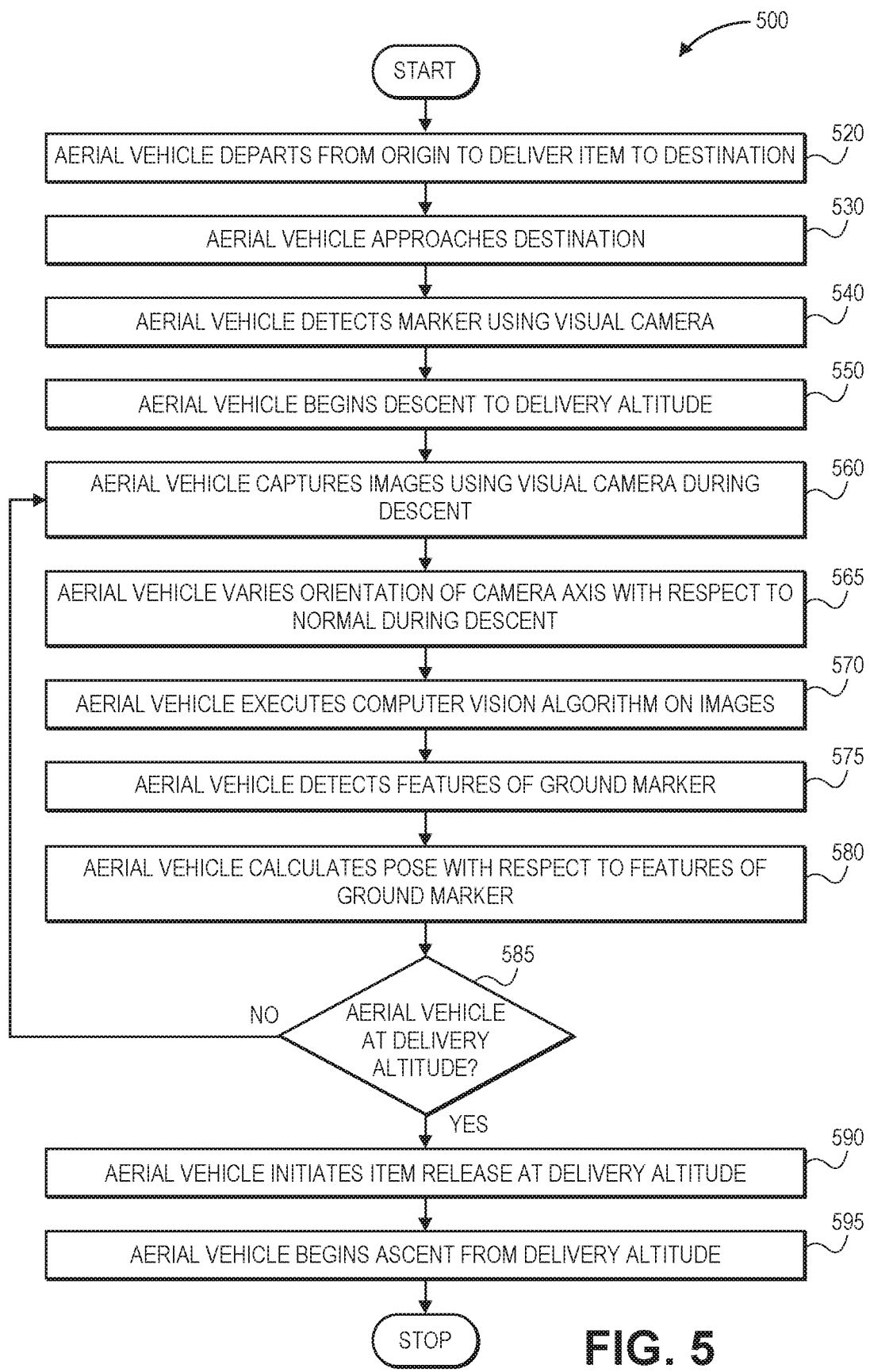
FIG. 5 is a flow chart of one process for enhancing visibility of ground markers in accordance with embodiments of the present disclosure.

Referring to FIG. 5, a flow chart 500 of one process for enhancing visibility of ground markers in accordance with embodiments of the present disclosure is shown. At box 520, an aerial vehicle departs from an origin to deliver an item to a destination, e.g., in response to an order for the item, or for any other purpose.

At box 530, the aerial vehicle approaches the destination, and at box 540, the aerial vehicle detects a ground marker using a visual camera having a field of view that extends below the aerial vehicle, at least in part, and is configured to capture images at any frame rate. For example, the aerial vehicle may be programmed with information or data regarding the visual appearance of one or more surfaces of the ground marker, which may, in some embodiments, have vertical variation among the visible aspects of such surfaces. Alternatively, in some other embodiments, the ground marker may be substantially flat, and may exhibit no vertical variation among its visible aspects.

After detecting the ground marker using the visual camera, the process advances to box 550, where the aerial vehicle begins a descent to a delivery altitude, e.g., by slowing or stopping forward or horizontal velocity, and controlling the aerial vehicle to reduce its altitude while traveling in a substantially vertical direction toward the ground marker. At box 560, the aerial vehicle captures images using a visual camera during the descent, e.g., at any frame rate using a visual camera having a field of view extending substantially below the aerial vehicle, at least in part. The visual camera that captures the images may be the same visual camera that detected the marker at box 540, or a different visual camera.

At box 565, the aerial vehicle varies the orientation of the camera axis of orientation with respect to normal during the descent. For example, in some embodiments, where the camera is mounted to the aerial vehicle by a motor mount, a multi-axis camera gimbal or any other system configured to temporarily vary the axis of orientation of the camera, e.g., by swaying the camera by small angles of one degree (1°), two degrees (2°), five degrees (5°), or another small angle. Varying the axis of orientation of the camera causes the ground marker to appear with different perspectives or at different angles within the field of view of the camera, which continues to capture images with the axis of orientation at the various axes.

At box 570, the aerial vehicle executes one or more computer vision algorithms on the images, and at box 575, the aerial vehicle detects one or more features of the ground marker within such images. For example, one or more computer systems aboard the aerial vehicle may execute one or more object recognition algorithms or techniques to recognize corners, edges or other features of the ground marker, and to determine, to any degree of confidence, whether the image depicts all or a portion of the ground marker, or to identify portions of the image depicting the ground marker.

At box 580, the aerial vehicle calculates a pose with respect to one or more features of the ground marker. For example, a control system or other computer systems, e.g., processors of the visual camera, may determine a pose of the aerial vehicle with respect to the marker in three-dimensional space, based on camera calibration parameters such as the focal length, the aspect ratio, the optical center, any distortion parameters, or the like.

At box 585, the aerial vehicle determines whether the aerial vehicle is positioned at a delivery altitude, e.g., a proper altitude from which the item may be released or otherwise deposited on the ground surface below the aerial vehicle. For example, a distance between the aerial vehicle may be determined from the pose calculated at box 580 and compared to a predetermined delivery altitude, which may be selected for a given aerial vehicle (or class of vehicles), a given item (or class of items), or for the destination, or on any other basis. The delivery altitude may be a predetermined height above the ground marker or, alternatively, an altitude of zero, e.g., on the ground surface.

If the aerial vehicle has not yet reached the delivery altitude, then the process returns to box 560, where the aerial vehicle continues to capture images using the visual camera during the descent. If the aerial vehicle has reached the delivery altitude, however, then the process advances to box 590, where the aerial vehicle initiates a release of the item at the delivery altitude, such as by opening a compartment or other space and dropping, urging, ejecting or otherwise releasing the item therefrom in any manner. At box 595, after initiating the release of the item at the delivery altitude, the aerial vehicle begins its ascent, and the process ends.

Figure 6A:
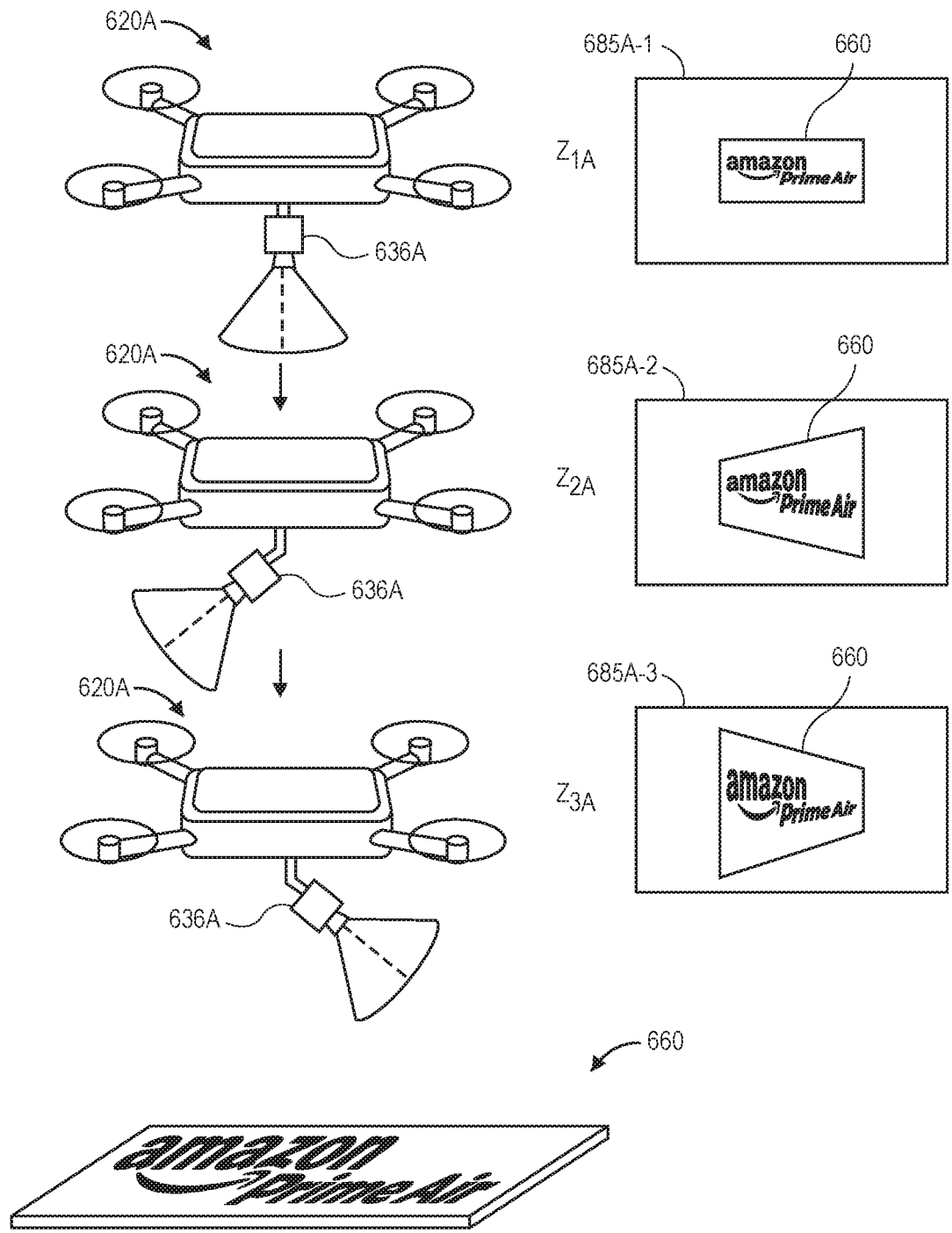
FIGS. 6A and 6B are views of aspects of one system for enhancing visibility of ground markers in accordance with embodiments of the present disclosure.
Figure 6B:
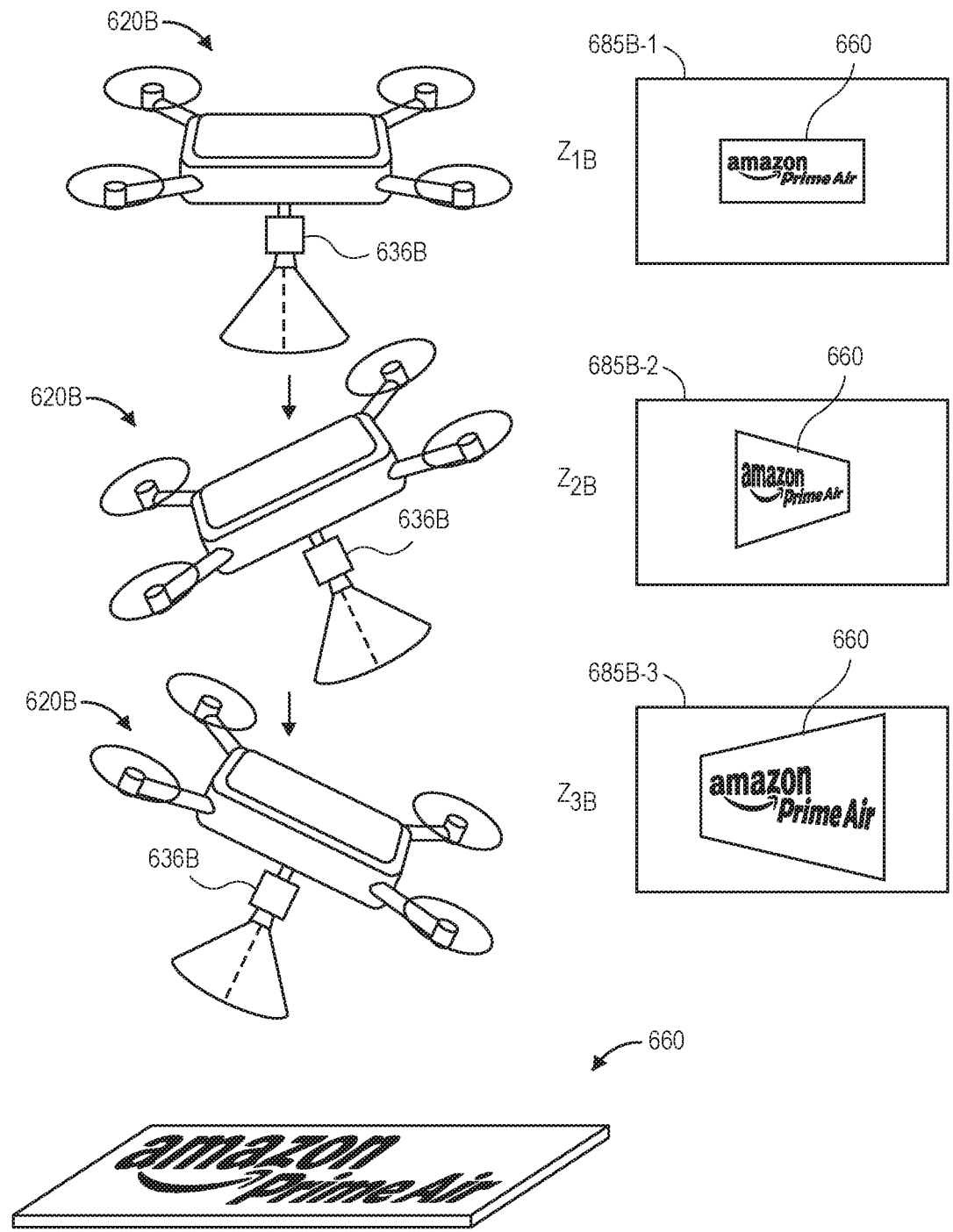

As is discussed above, an axis of orientation of a camera may be varied in any manner, in order to cause a ground marker to exhibit a vertical variation in the appearance of one or more visible surfaces. Referring to FIGS. 6A and 6B, views of aspects of one system for enhancing visibility of ground markers in accordance with embodiments of the present disclosure are shown. Except where otherwise noted, reference numerals preceded by the number "6" in FIGS. 6A and 6B refer to elements that are similar to elements having reference numerals preceded by the number "4" in FIGS. 4A through 4D, by the number "2" in FIG. 2 or by the number "1" shown in FIGS. 1A through 1H.

As is shown in FIG. 6A, an aerial vehicle 620A descends toward a ground marker 660, and captures images using a camera 636A having a field of view that extends below the aerial vehicle 620A. The camera 636A is mounted to a body or a frame of the aerial vehicle 620A by a motor mount, a multi-axis camera gimbal or another system that is configured to temporarily impart small changes upon an axis of orientation of the camera 636A during the descent. For example, as is shown in FIG. 6A, with the aerial vehicle 620A at a first altitude $z_{1A}$, the camera 636A aligned substantially vertically downward, e.g., with an axis of orientation at an angle $\theta_{1A}$ normal to the ground marker 660, the camera 636A captures a first image 685A-1. As is also shown in FIG. 6A, with the aerial vehicle 620A at a second altitude $z_{2A}$, the camera 636A is rotated or pivoted such that the axis of orientation is aligned at an angle $\theta_{2A}$ with respect to vertical, and the camera 636A captures a second image 685A-2, which depicts the ground marker 660 from a perspective that shows vertical variation between visible aspects of the ground marker 660, e.g., a left side and a right side of the ground marker 660. Likewise, as is further shown in FIG. 6A, with the aerial vehicle 620A at a third altitude $z_{3A}$, the camera 636A is rotated or pivoted such that the axis of orientation is aligned at an angle $\theta_{3A}$ with respect to vertical, and the camera 636A captures a third image 685A-3, which depicts the ground marker 660 from a perspective that shows vertical variation between visible aspects of the ground marker 660, e.g., the right side and the left side of the ground marker 660.

Similarly, an aerial vehicle may be programmed or instructed to vary an axis of orientation of a camera through the operation of one or more propulsion motors and/or control surfaces. As is shown in FIG. 6B, an aerial vehicle 620B descends toward the ground marker 660, and captures images using a camera 636B having a field of view that extends below the aerial vehicle 620B. The camera 636B has an axis of orientation that is fixed with respect to a body or a frame of the aerial vehicle 620B.

As is shown in FIG. 6B, the aerial vehicle 620B is substantially flat, e.g., with zero pitch and roll angles, at a first altitude $z_{1B}$. With the aerial vehicle 620B at the first altitude $z_{1B}$, the camera 636B is aligned substantially vertically downward, e.g., with an axis of orientation at an angle $\theta_{1B}$ normal to the ground marker 660, and captures a first image 685B-1.

As is also shown in FIG. 6B, with the aerial vehicle 620B at a second altitude $z_{2B}$, the aerial vehicle 620B executes one or more maneuvers that impart positive pitch and/or roll angles onto the aerial vehicle 620B, such as by increasing or decreasing speeds of one or more propulsion motors, or by operating one or more control surfaces, thereby causing the axis of orientation of the camera 636B to be aligned at an angle $\theta_{2B}$ with respect to vertical. With the aerial vehicle 620B at the second altitude $z_{2B}$, and with the axis of orientation at the angle $\theta_{2B}$ with respect to vertical, the camera 636B captures a second image 685B-2, which depicts the ground marker 660 from a perspective that shows vertical variation between visible aspects of the ground marker 660, e.g., the right side and the left side of the ground marker 660.

As is further shown in FIG. 6B, with the aerial vehicle 620B at a third altitude $z_{3B}$, the aerial vehicle 620B executes one or more additional maneuvers that impart different positive pitch and/or roll angles onto the aerial vehicle 620B, thereby causing the axis of orientation of the camera 636B to be aligned at an angle $\theta_{3B}$ with respect to vertical. With the aerial vehicle 620B at the third altitude $z_{3B}$, and with the axis of orientation at the angle $\theta_{3B}$ with respect to vertical, the camera 636B captures a third image 685B-3, which depicts the ground marker 660 from a perspective that shows vertical variation between visible aspects of the ground marker 660, e.g., the left side and the right side of the ground marker 660.

Although some of the embodiments of the present disclosure describe enhancing the visibility of ground markers for identifying delivery areas for unmanned aerial vehicles, the systems and methods of the present disclosure are not so limited. Rather, those of ordinary skill in the pertinent arts will recognize that one or more of the embodiments disclosed herein may be utilized to enhance the visibility of areas for the performance of any mission by any aerial vehicle, and are not limited to deliveries or for use by unmanned aerial vehicles. Moreover, although some of the embodiments of the present disclosure depict aerial vehicles or ground markers that are substantially small in size, those of ordinary skill in the pertinent arts will recognize that the systems and methods of the present disclosure are not so limited. Rather, aerial vehicles or ground markers may be of any size or shape in accordance with the present disclosure. Furthermore, the systems and methods of the present disclosure need not be limited for use in deliveries, take-offs or landings. Instead, the systems and methods of the present disclosure may be used to enhance the visibility of ground surfaces for low-altitude hovering or travel, or for any other purpose.

The ground markers of the present disclosure need not be limited for use in association with a building or other facility. For example, because ground markers of the present disclosure are substantially portable in nature, a ground marker may be carried or otherwise transported by one or more persons to locations that are not associated with any buildings or facilities, e.g., by cyclists, hikers or campers, in one or more of such locations to enhance the visibility of ground surfaces at such locations for the performance of one or more missions, e.g., deliveries of items to such locations. Furthermore, although some of the embodiments disclosed herein involve the manual placement or laying down of ground markers on one or more ground surfaces by humans, those of ordinary skill in the pertinent arts will recognize that the systems and methods of the present disclosure are not so limited. Rather, the ground markers of the present disclosure may be placed or laid down on such surfaces by one or more machines, e.g., autonomous mobile robots, or trained non-human animals.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3 or 5, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
   an aerial vehicle comprising at least one propulsion motor, at least one camera having a field of view extending below the aerial vehicle, and at least one computer system in communication with the at least one camera; and
   a ground marker comprising a frame and a platform disposed within the frame,
      wherein the frame comprises a rectangular hollow formed from a plurality of panels,
      wherein at least one of the plurality of panels is substantially translucent,
      wherein a surface of the platform comprises at least one marking thereon,
      wherein at least a first portion of the surface and at least a second portion of the surface are at different heights with respect to the frame,
   wherein the at least one marking is visible through the at least one of the plurality of panels, wherein the at least one computer system is programmed with one or more sets of instructions that, when executed, cause the aerial vehicle to at least:
select at least a course, a speed and a first altitude for travel to a location associated with the ground marker;
cause the aerial vehicle to travel on the course and the speed, and at the first altitude;
determine that the aerial vehicle is within a vicinity of the location;
capture at least a first image by the camera at a first time;
detect at least a portion of the ground marker within the first image; and
in response to detecting at least the portion of the ground marker within the first image,
cause the aerial vehicle to descend toward the ground marker;
capture at least a second image by the camera at a second time, wherein the second image is captured with the aerial vehicle descending toward the ground marker;
calculate a distance between the aerial vehicle and the ground marker based at least in part on the second image;
determine that the aerial vehicle is at a second altitude based at least in part on the distance; and
in response to determining that the aerial vehicle is at the second altitude,
cause the aerial vehicle to stop descending toward the ground marker.

2. The system of claim 1, wherein each of the plurality of panels is formed at least in part from acrylic or plexiglass, wherein the platform is formed from one of a wood, a plastic, a metal or a composite, and
wherein the at least one marking is formed from one or more of an ink, a paint, a dye, a pigment, a decal, or a sticker applied to the platform.

3. The system of claim 1, wherein the aerial vehicle further comprises a compartment, and
wherein the one or more sets of instructions, when executed, further cause the aerial vehicle to at least:
in response to determining that the aerial vehicle is at the second altitude,
release an item onto the ground marker from the compartment.

4. The system of claim 1, wherein the second altitude is one of:
a predetermined altitude associated with the release of the item; or
an altitude of the ground marker.

5. The system of claim 1, wherein the at least one marking comprises one or more of:
a one-dimensional bar code;
a two-dimensional bar code;
an alphanumeric character; or
a symbol.

6. A method comprising:
capturing a first image by a camera provided aboard an aerial vehicle, wherein the first image is captured at a first time with the aerial vehicle at a first altitude;
determining, by at least a first computer system, that the first image depicts at least a portion of a ground marker associated with a location, wherein the ground marker rests on a ground surface associated with the location, and wherein the ground marker comprises at least one visible surface having a first aspect provided at a first distance from the ground surface and a second aspect provided at a second distance from the ground surface; and
in response to determining that the first image depicts at least the portion of the ground marker associated with the location,
operating one or more propulsion motors of the aerial vehicle to cause the aerial vehicle to descend toward the ground marker;
with the aerial vehicle descending toward the ground marker,
capturing at least a second image by the camera, wherein the second image is captured at a second time;
determining, by at least the first computer system, that the second image depicts at least a portion of the ground marker;
calculating a distance between the aerial vehicle and the ground marker based at least in part on the second image;
determining that the aerial vehicle is at a second altitude based at least in part on the distance; and
in response to determining that the aerial vehicle is at the second altitude,
causing the aerial vehicle to stop descending toward the ground marker.

7. The method of claim 6, wherein calculating the distance between the aerial vehicle and the ground marker based at least in part on the second image comprises:
determining a pose of the aerial vehicle with respect to the portion of the ground marker based at least in part on the second image,
wherein the distance is calculated based at least in part on the pose of the aerial vehicle.

8. The method of claim 6, wherein the ground marker comprises a frame formed from a plurality of panels and a platform having the at least one visible surface disposed within the frame,
wherein the frame comprises a rectangular hollow formed from the plurality of panels,
wherein at least one of the plurality of panels is substantially translucent,
wherein the at least one visible surface comprises at least one marking thereon, and
wherein the at least one marking is visible through the at least one of the plurality of panels.

9. The method of claim 6, wherein the ground marker comprises a first flexible panel, a second flexible panel placed upon the first flexible panel, and a valve,
wherein the first flexible panel and the second flexible panel define an inflatable bladder,
wherein the at least one visible surface comprises at least one marking thereon, and
wherein the at least one visible surface is an upper surface of the second flexible panel facing away from the first flexible panel.

10. The method of claim 6, wherein the ground marker comprises a frame defined by a base, a first panel, a second panel and a third panel,
wherein at least the first panel and the second panel are joined at a raised edge,
wherein the at least one visible surface is provided on at least the first panel and the second panel,
wherein the at least one visible surface comprises at least one marking thereon, wherein the first visible aspect of the at least one visible surface is provided adjacent an intersection between one of the first panel or the second panel and the base, and wherein the second visible aspect of the at least one visible surface is provided adjacent the raised edge.

11. The method of claim 6, wherein the ground marker comprises a bin having a bottom, a first side panel, a second side panel, a third side panel and a fourth side panel, wherein the bottom, the first side panel, the second side panel, the third side panel and the fourth side panel define a cavity, wherein the bin further comprises a platform about a perimeter of the cavity, wherein the at least one visible surface comprises a first visible surface on the bottom within the cavity and a second visible surface on the platform about the perimeter of the cavity, wherein the first visible aspect is a first marking on the first visible surface, and wherein the second visible aspect is a second marking on the second visible surface.

12. The method of claim 6, further comprising:
receiving, by at least the first computer system, at least one instruction to travel to the location;
selecting, by at least the first computer system, at least one of a course or a speed for traveling to the location; and
causing, by at least the first computer system, the aerial vehicle to travel on the course and at the speed, and at the first altitude.

13. The method of claim 12, further comprising:
receiving, by at least a second computer system associated with one of an electronic marketplace or a fulfillment center, an order for a delivery of an item to the location; and
in response to receiving the order for the delivery of the item,
  causing, by at least the second computer system, the item to be loaded into a compartment of the aerial vehicle; and
  transmitting, by at least the second computer system, the at least one instruction to the first computer system.

14. The method of claim 13, further comprising:
in response to determining that the aerial vehicle is at the second altitude,
  causing the aerial vehicle to discharge the item from the compartment.

15. The method of claim 6, wherein operating the one or more propulsion motors of the aerial vehicle to cause the aerial vehicle to descend toward the ground marker comprises:
operating the one or more propulsion motors of the aerial vehicle to maintain the ground marker within the field of view of the camera.

16. The method of claim 6, wherein the at least one visible surface comprises at least one marking thereon, and
wherein the at least one marking comprises one or more of:
a one-dimensional bar code;
a two-dimensional bar code;
an alphanumeric character; or
a symbol.

17. A marker comprising:
a frame defined by a plurality of panels, wherein a first panel of the plurality of panels is at least partially translucent, and wherein the frame is configured to rest on a ground surface with a second panel of the plurality of panels in contact with the ground surface, and
a platform disposed within the frame, wherein the platform comprises a visible surface having a plurality of markings thereon,
wherein the platform is disposed within the frame at a non-parallel angle with respect to the second panel,
wherein a first aspect of the visible surface is provided at first distance from the second panel, and
wherein a second aspect of the visible surface is provided at a second distance from the second panel.

18. The marker of claim 17, wherein each of the plurality of panels is formed at least in part from acrylic or plexiglass,
wherein the platform is formed from one of a wood, a plastic, a metal or a composite, and
wherein the at least one marking is formed from one or more of an ink, a paint, a dye, a pigment, a decal, or a sticker.

19. The marker of claim 17, wherein an interior of the frame defines a rectangular hollow, and wherein the platform is disposed within the rectangular hollow.

20. The marker of claim 17, wherein the at least one marking comprises one or more of :
a one-dimensional bar code,
a two-dimensional bar code,
an alphanumeric character, or
a symbol.

* * * * *